(12) United States Patent
Sasaki et al.

(10) Patent No.: US 8,061,914 B2
(45) Date of Patent: Nov. 22, 2011

(54) PRINTER FOR PRINTING ON SHEET PAPER AND ORTHOGONALLY FED ROLL PAPER

(75) Inventors: Toshiyuki Sasaki, Nagano-ken (JP);
Masashi Fujikawa, Nagano-ken (JP);
Kunio Omura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/832,502

(22) Filed: Jul. 8, 2010

(65) Prior Publication Data

US 2010/0272491 A1    Oct. 28, 2010

Related U.S. Application Data

(63) Continuation of application No. 12/188,760, filed on Aug. 28, 2008, now Pat. No. 7,770,793, which is a continuation of application No. 11/417,840, filed on May 3, 2006, now Pat. No. 7,435,023, which is a continuation of application No. 10/763,901, filed on Jan. 23, 2004, now Pat. No. 7,056,047.

(30) Foreign Application Priority Data

| Jan. 24, 2003 | (JP) | 2003-016784 |
| Jan. 24, 2003 | (JP) | 2003-016785 |
| Jan. 24, 2003 | (JP) | 2003-016786 |
| Aug. 22, 2003 | (JP) | 2003-299068 |

(51) Int. Cl.
*B41J 11/52* (2006.01)
*B41J 11/48* (2006.01)

(52) U.S. Cl. ............. 400/607.2; 400/605; 400/607

(58) Field of Classification Search ............ 400/591, 400/599, 605, 607, 607.2, 607.1
See application file for complete search history.

(56) References Cited

U.S. PATENT DOCUMENTS

| 5,080,513 A | 1/1992 | Clary |
| 5,274,567 A | 12/1993 | Kallin et al. |
| 5,411,342 A * | 5/1995 | Horie et al. ............ 400/613 |
| 5,533,817 A | 7/1996 | Harris et al. |
| 5,668,581 A * | 9/1997 | Tsuji et al. ............ 347/37 |
| 6,203,223 B1 | 3/2001 | Nakayama et al. |
| 6,249,303 B1 | 6/2001 | Mochizuki et al. |
| 6,257,783 B1 | 7/2001 | Hanaoka et al. |
| 6,261,008 B1 | 7/2001 | Omura |
| 6,296,405 B1 * | 10/2001 | Brewington et al. ....... 400/188 |
| 6,361,163 B1 | 3/2002 | Fowlkes |
| 6,386,537 B1 | 5/2002 | Howard et al. |
| 6,457,888 B1 | 10/2002 | Matsumoto |
| 6,530,704 B2 | 3/2003 | Omura |
| RE40,269 E | 4/2008 | Mochizuki et al. |
| RE41,716 E * | 9/2010 | Fernando et al. ........ 235/380 |
| 2004/0118910 A1 | 6/2004 | Gallo-Hendrikx |
| 2008/0048393 A1* | 2/2008 | Giacometto et al. .... 271/265.03 |

FOREIGN PATENT DOCUMENTS

| JP | 58-47960 | 9/1981 |
| JP | 01-161474 | 6/1989 |
| JP | 02-033042 | 2/1990 |

(Continued)

*Primary Examiner* — Daniel J Colilla

(57) ABSTRACT

A printer has transportation paths for conveying media in two directions, including a first transportation path P1 and a second transportation path P2 (or third transportation path P3) perpendicular to the first transportation path P1. The printer is constructed and configured to provide a single compact unit that can be used for media processing by reading and printing the media, as well as for printing receipts and validation printing.

1 Claim, 15 Drawing Sheets

FOREIGN PATENT DOCUMENTS

| | | |
|---|---|---|
| JP | 03-135264 | 6/1991 |
| JP | 04-278693 | 10/1992 |
| JP | 04-316157 | 11/1992 |
| JP | 05-042735 | 2/1993 |
| JP | 05-178515 | 7/1993 |
| JP | 05-201095 | 8/1993 |
| JP | 06-015893 | 1/1994 |
| JP | 06-047967 | 2/1994 |
| JP | 06-271167 | 9/1994 |
| JP | 08-048465 | 2/1996 |
| JP | 11-193159 | 7/1999 |
| JP | 11-291572 | 10/1999 |
| JP | 11-334121 | 12/1999 |
| JP | 11-348364 | 12/1999 |
| JP | 11-349203 | 12/1999 |
| JP | 2000-280576 | 10/2000 |
| JP | 2000-289893 | 10/2000 |
| JP | 2000-344428 | 12/2000 |
| JP | 2001-058749 | 3/2001 |
| JP | 2001-063030 | 3/2001 |
| JP | 2001-063893 | 3/2001 |
| JP | 2001-272830 | 10/2001 |
| JP | 2002-160414 | 6/2002 |
| JP | 2002-192759 | 7/2002 |
| JP | 2002-200762 | 7/2002 |
| JP | 2002-255393 | 9/2002 |
| JP | 2002-361938 | 12/2002 |

\* cited by examiner

PRINTER FOR PRINTING ON SHEET PAPER AND ORTHOGONALLY FED ROLL PAPER

RELATED APPLICATIONS

This application is a continuation of, and claims priority under 35 U.S.C. §120 on, U.S. application Ser. No. 12/188,760, filed Aug. 28, 2008, which is a continuation of, and claims priority under 35 U.S.C. §120 on, U.S. application Ser. No. 11/417,840, filed May 3, 2006, now U.S. Pat. No. 7,435,023, which is a continuation of, and claims priority under 35 U.S.C. §120 on, U.S. application Ser. No. 10/763,901, filed Jan. 23, 2004, now U.S. Pat. No. 7,056,047. The content of each of these related applications is incorporated by reference herein in its entirety. Japanese patent application nos. 2003-016784, 2003-016785, 2003-016786 and 2003-299068 are also incorporated by reference herein in their entirety.

BACKGROUND

1. Field of Invention

The present invention relates to a versatile printing apparatus.

2. Description of Related Art

Payment systems using commercial bank checks ("checks") to transfer money are common particularly in Europe and North America. Payments and transfers of many kinds are accomplished by accepting checks. These checks are typically brought to a financial institution such as a bank for deposit in a bank account or for check cashing.

Numerous checks must therefore be processed in a short time at teller windows in every bank branch. The main tasks performed at the teller window involve a bank clerk verifying the check, confirming the date, and verifying the signature, and then depositing the funds or cashing the check. The received check is also endorsed and a receipt is issued as needed.

Some banks have started to electromagnetically read checks brought to the bank, and efforts to improve check processing efficiency in the future by connecting bank branches and different banks on-line are underway.

To this end, check processing machines having a magnetic ink character reader (MICR) for reading information written in magnetic ink on each check and an image scanner for capturing an image of each check are installed in many bank branches today. These processing machines are large-scale systems used for processing large volumes of checks at high speed, and cannot be located at the teller window. A large space used just for check processing must therefore normally be set aside in the bank, and all checks are processed there. After the checks are processed, checks collected from each branch are delivered by armored car, for example, to a specified central clearing house.

Electromagnetically reading checks at the teller window is also being tried, and small check processing devices that can be installed at the teller window have been proposed.

The check processing device referred to above has a check transportation mechanism, a magnetic ink character reader (MICR), scanner, and printer disposed along a check transportation path.

When the bank teller receiving a check from a customer passes the check through this check processing device, the check processing device reads the check using the MICR and scanner, and then endorses the check using the printer. This check processing device is taught in Japanese Pat. Appl. Pub. No. 2000-344428.

After reading a check with the MICR and scanner, and then printing the endorsement using this check processing machine, the bank teller verifies the information on the check, including the date and signature, using either the check itself or the scanned image of the check. Using the check image, however, requires providing a display to operate with this check processing machine.

If this check verification shows that there is no problem with the check, the check is paid or deposited. This requires data entry to a computer terminal separate from the above check processing machine, and printing a customer receipt and bank branch receipt using a printer that is also separate from this check processing machine. If the back of the check must be printed again, a printer separate from the check processing machine must be used for validation printing. Validation printing involves loading the check from the top and then ejecting the check from the top after printing. This task is performed repeatedly in the bank for endorsing checks and printing slips.

In other words, when a check is passed through a check processing machine as described above for processing, additional data must be inputted to a different system, and receipts and other forms must be printed using a separate printer.

Check handling is therefore complicated, and handling errors necessarily occur more easily. This procedure also requires additional time and checks cannot be processed quickly.

Furthermore, the need to install a separate printer in addition to the check processing machine puts additional pressure on the limited working space available at the teller window, and thus reduces job productivity. Being able to quickly and accurately process work in the confined space available at the teller window is a major problem for banks. This problem is not limited to banks, however, and is a problem common to any job of processing checks and other such documents in a confined space.

An object of the present invention is therefore to solve the above problem of the prior art and provide a processing and printing apparatus that by means of a single compact device can process and print slips such as checks and then print receipts, for example.

SUMMARY OF INVENTION

The printing apparatus of the present invention solves the problems described above using two print medium transportation paths which intersect at a given location so that checks or other print media can be printed at the intersecting location after it was read by a magnetic ink character reader and/or a scanner on one transportation path and a receipt or another print media transported from the other transportation path can be also printed at the intersecting location, using a common print head aligned along the intersecting location.

The present invention entails a printer comprising a paper feed unit constructed to house sheet paper; a first conveyance path and a first conveyance mechanism configured to convey sheet paper from the paper feed unit using the first conveyance path; a roll paper compartment constructed to hold roll paper; a second conveyance path and a second conveyance mechanism configured to convey roll paper from the roll paper compartment using the second conveyance path; a printer head configured to print on sheet paper and roll paper; and a carriage configured to move the printer head in the direction in which sheet paper is conveyed and along a direction vertical to the direction in which roll paper is conveyed.

Preferably, the first and second conveyance paths are substantially orthogonal to one another, such that sheet paper can pass between roll paper and the printer head.

Preferably, the printer has a plurality of operating modes include a first operating mode for printing on sheet paper while sheet paper is conveyed by the first conveyance mechanism on the first conveyance path, and a second operating mode for printing on sheet paper while sheet paper is not being conveyed and the printer head is moved by the carriage. The printer may further include a third operating mode for printing while moving the carriage when printing is performed on roll paper with the printer head. The third operating mode may further include using a part of the second conveyance path and printing with the printer head, as the carriage is being moved, on second sheet paper inserted into an upper opening on the first conveyance path.

The printer may further include a third conveyance path configured to convey second sheet paper, where the third conveyance path includes at least a part of the second conveyance path; and a third conveyance mechanism configured to convey second sheet paper using the third conveyance path.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 13(a-c) are plan views showing the movement of components of the paper feed mechanism in which

FIGS. 14(a-c) are plan views showing the movement of components of the switching mechanism FIG. 14(a) showing the discharge rollers 108 in the paper feed position with the movable roller 108b contacting the drive roller 108a; FIG. 14(b) showing the retracted position where the movable roller 108b is separated from the drive roller 108a.

DESCRIPTION OF THE PREFERRED EMBODIMENTS

A preferred embodiment of a printing apparatus according to the present invention is hereafter described with reference to the accompanying figures, particularly FIGS. 1-5.

Figure 3:
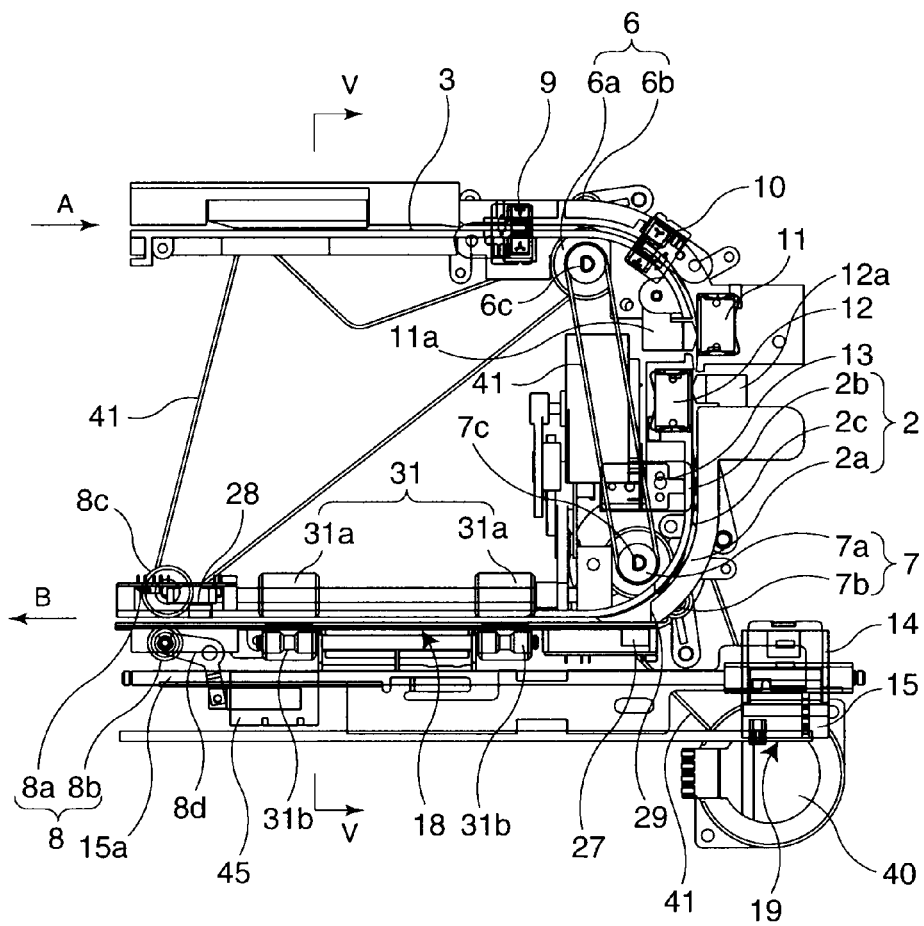
FIG. 3 is a plan view with some parts removed from the printer.
Figure 4:
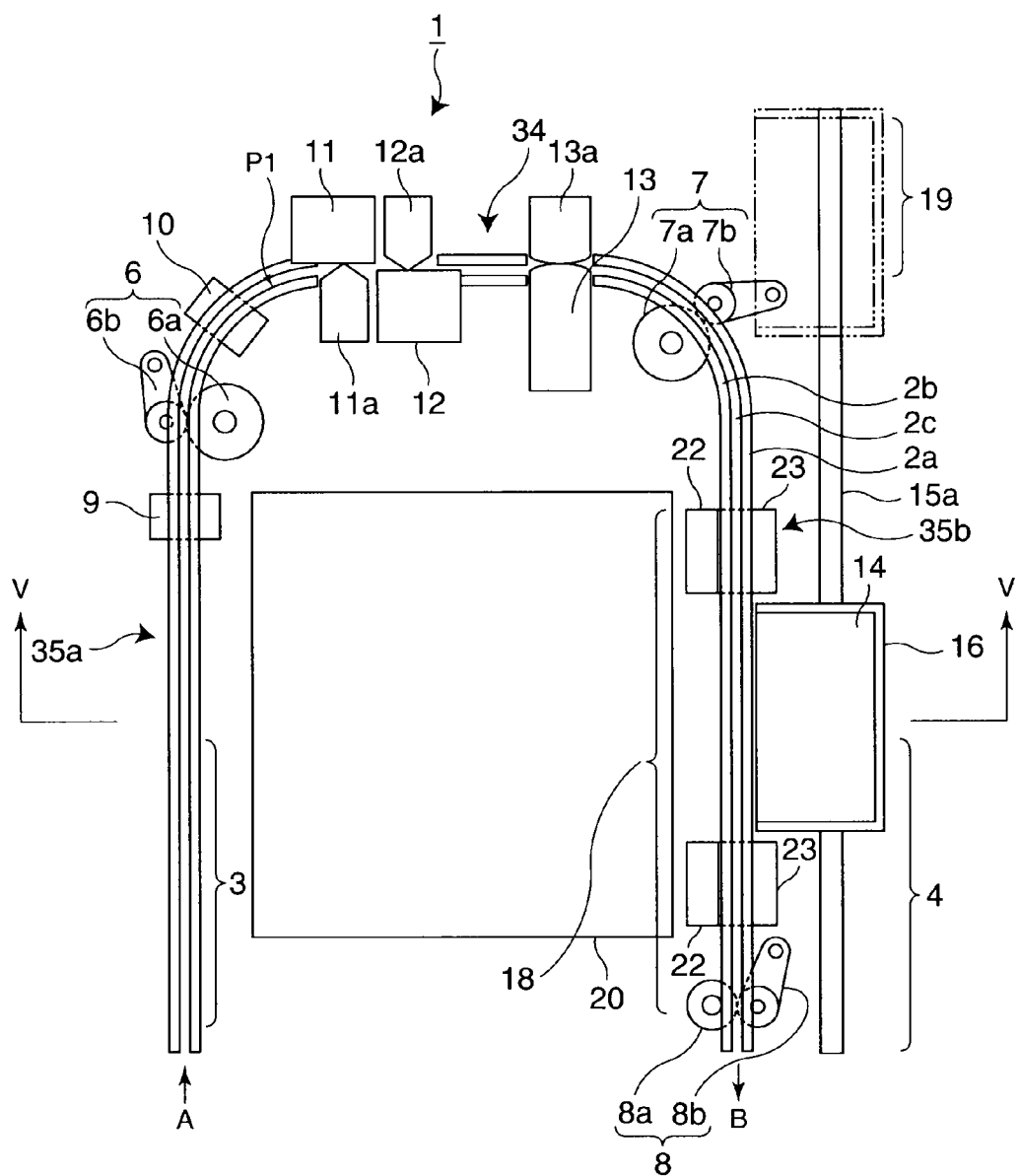
FIG. 4 is a schematic diagram of the first transportation path.
Figure 5:
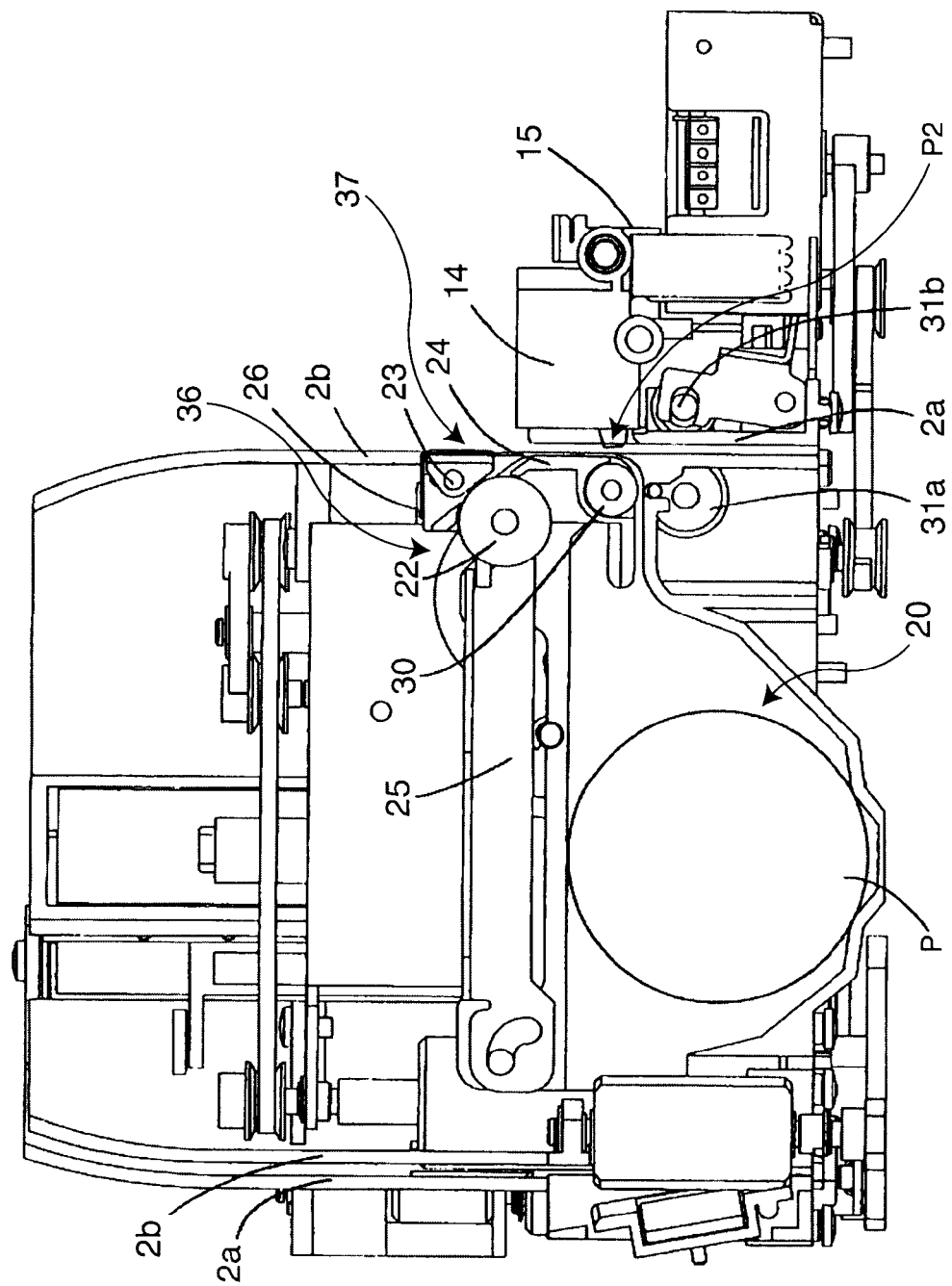
FIG. 5 is a section view taken along the lines V-V in FIG. 4 and represents an elevation of the second transportation path and third transportation path.

FIG. 3 is a plan view of the printing apparatus with selected parts removed, FIG. 4 is a schematic diagram of the first transportation path, and FIG. 5 is an elevation showing the second transportation path and third transportation path.

Figure 2A:
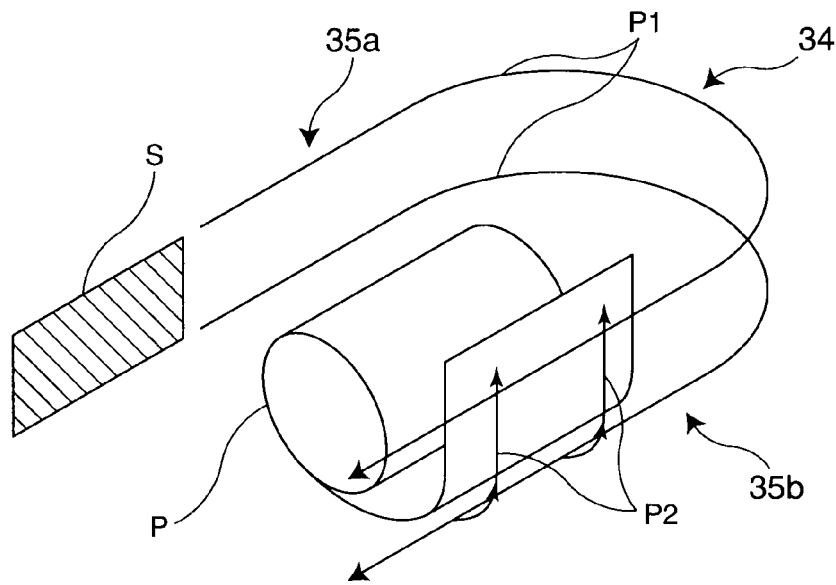
FIGS. 2(a-b) are schematic diagrams showing the relationship between the first transportation path, second transportation path, and third transportation path in a printer according to a preferred embodiment of the invention with FIG. 2(a) showing the direction for a check and roll paper and FIG. 2(b) showing the direction for a check or slips of paper along the first transportation path and a separate validation check or validation slip along the second transportation path.
Figure 2B:
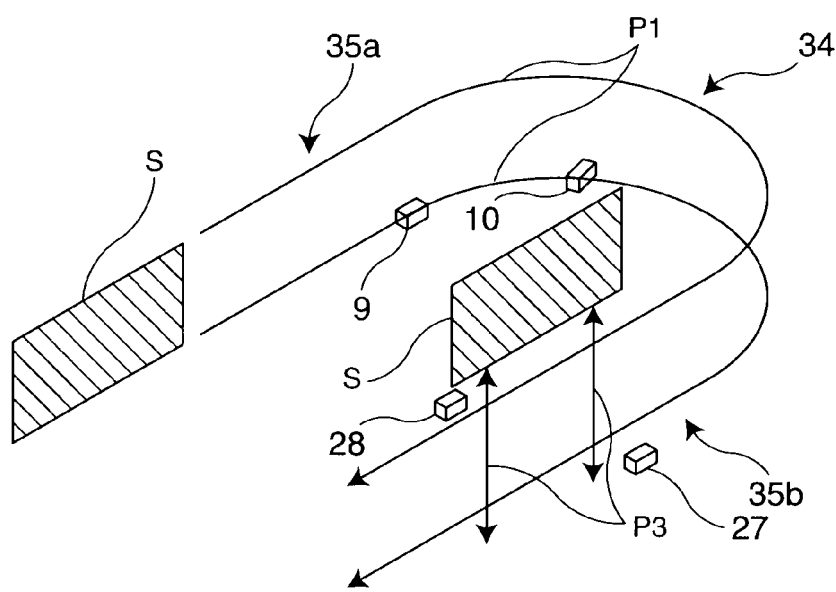

The printer 1 according to this embodiment of the invention has a substantially U-shaped first transportation path P1 as shown in FIG. 2(a) or 2(b) for conveying a first slip of paper S (representing e.g. a check) in a direction parallel to the horizontal, and has a second transportation path P2 and a third transportation path P3 both of which lie substantially perpendicular to and intersect the first transportation path P1 for conveying a second slip S or for conveying roll paper P in the vertical direction. This printer 1 is a check processing apparatus that can, for example, be installed at a teller window visited by customers in a bank to process checks as received from the customer, and to print receipts using roll paper P.

First Transportation Path

Figure 1:
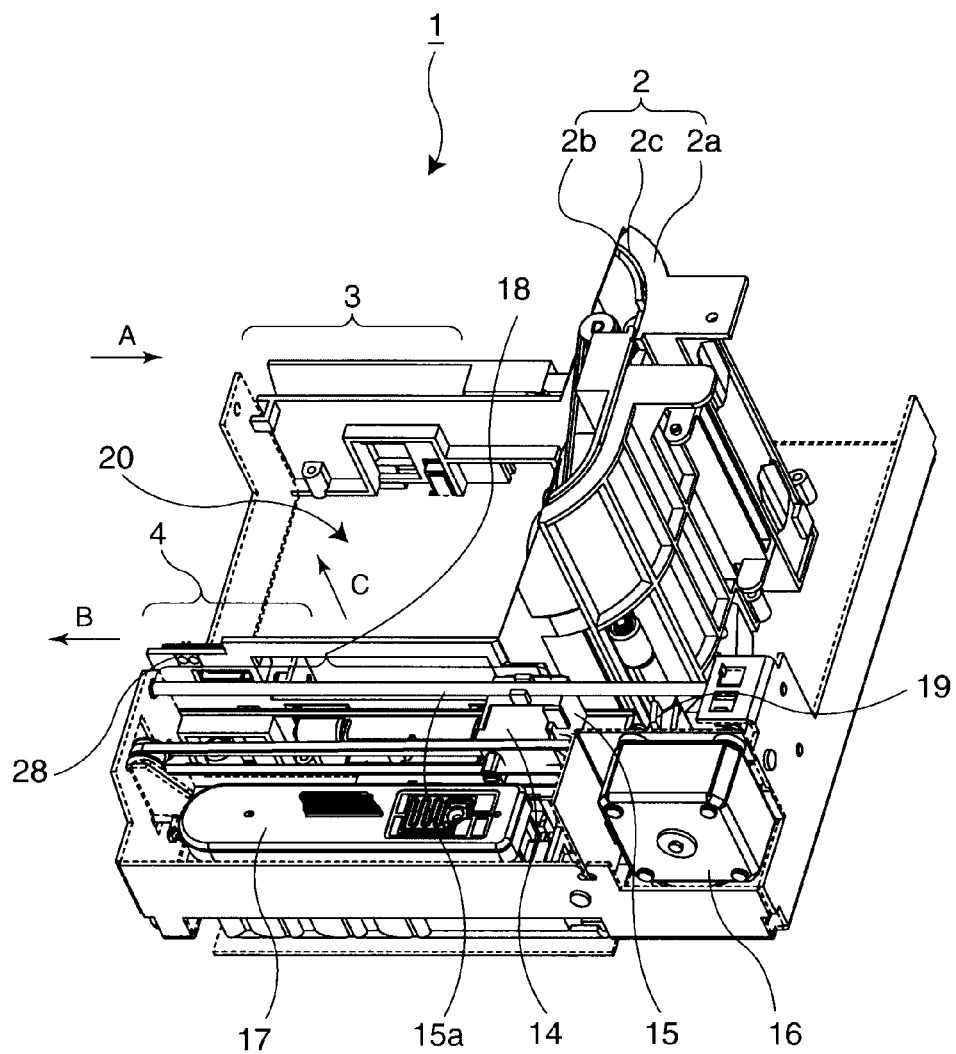
FIG. 1 is an oblique overview of a printer according to a preferred embodiment of the invention with the case removed.

Referring now to FIGS. 1, 2 and 3, the first transportation path P1 has a transportation path section 2c between an outside guide 2a and an inside guide 2b, which is generally U-shaped and has straight section parts 35a, 35b connected to opposite ends of the bottom portion 34 of the U-shaped section 2c. This first transportation path P1 conveys a slip S in the direction of arrow A first along straight part 35a, then changes the direction of the slip S 180 degrees from the direction of insertion by way of the U-shaped bottom portion 34 of the path P1, and then discharges the slip S in the direction of arrow B by way of straight part 35b.

A paper supply part 3 is aligned with the straight part 35a. This paper supply part 3 is where slips S are loaded before being conveyed through the first transportation path P1. The paper supply part 3 could also be configured to include an auto-feeder for automatically supplying a plurality of slips S one by one into the first transportation path P1. If the slips S are checks, they are in principle loaded with the back facing the inside guide 2b in this printer 1.

First transportation rollers 6, second transportation rollers 7, and discharge rollers 8 are disposed along the first transportation path P1 and represent a first transportation mechanism for conveying slips S. The first transportation rollers 6, second transportation rollers 7, and discharge rollers 8 each include a respective drive roller 6a, 7a, 8a, and a pressure roller 6b, 7b, 8b for pressing a slip S against the drive roller 6a, 7a, 8a. In the example shown in FIG. 3, a pulley 6c, 7c, 8c is disposed coaxially to the drive roller 6a, 7a, 8a. Three belts 41 are wound around these pulleys 6c, 7c, 8c and a pulley (not shown in the figure) is mounted on the horizontal paper feed motor 40 (hereinafter referred as HF motor). This enables the drive rollers 6a, 7a, and 8a to be driven by a single HF motor 40.

It should be noted as shown in FIG. 3 that the pressure roller 8b of discharge rollers 8 is mounted on the distal end of a rotary arm 8d. Driving an actuator 45 causes the rotary arm 8d to turn so that the pressure roller 8b can be set to a closed position (transportation position) in contact with the drive roller 8a, and an open position (retracted position) separated from the drive roller 8a.

The first transportation rollers 6 and second transportation rollers 7 are positioned so that when the leading edge of a slip S reaches the second transportation rollers 7, the trailing edge of the slip S is located downstream the paper supply part 3 and in front of the first transportation rollers 6 leaving a feed margin for the first transportation rollers 6. The second transportation rollers 7 and 8 are likewise positioned so that when the leading edge of a slip S reaches the discharge rollers 8, the trailing edge of the slip S is located downstream of the first transportation rollers 6 leaving a feed margin for the second transportation rollers 7.

A BOF (bottom of form) detector 9 is disposed upstream of the first transportation rollers 6, and a TOF (top of form) detector 10 is disposed downstream of the first transportation rollers 6. These detectors 9, 10 are disposed near the bottom of the first transportation path P1 and detect the leading edge and trailing edge of a slip S conveyed by HF motor 40 operation. The HF motor 40 is driven according to form detection by the BOF detector 9, and the first transportation rollers 6, second transportation rollers 7, and discharge rollers 8 start to turn. The configuration shown in FIG. 3 could also be changed to accommodate multiple motors or may include a clutch to the drive roller 6a, 7a and 8a so that the rollers 6, 7, 8 are turned independently.

Scanners 11 and 12 and an MICR 13 are arranged along the U-shaped bottom 34 in order from the upstream side between the TOF detector 10 and second transportation rollers 7.

The scanners 11 and 12 are image scanning sensors for capturing images of the slip S. The scanner 11 is disposed on the outside guide 2a side of the first transportation path P1 in order to capture an image of the back of each slip S, and the other scanner 12 is disposed on the inside guide 2b side of the first transportation path P1 to capture an image of the slip S front. Pressure members (rollers) 11a and 12a disposed on the opposite side of the first transportation path P1 press the slip S to the surface of the scanner 11, 12 for scanning.

The MICR 13 is a magnetic sensor for reading magnetic ink characters printed on the front of the slip S, and is disposed on the inside guide 2b side of the first transportation path P1 so as to face the front of the slip S. The MICR 13 reads magnetic ink characters with the slip S pressed to the MICR 13 by an opposing pressure member (pad) 13a disposed on the opposite side of the first transportation path P1.

A print head 14 is disposed as more clearly shown in FIG. 4 facing the first transportation path P1 in the straight part portion 35b between the second transportation rollers 7 and discharge rollers 8. The print head 14 is mounted on a carriage 15, which is movable by way of guide shaft 15a permitting the print head 14 to move on the carriage 15 from between the printing range 18 to the fully retracted position 19. When the print head 14 is in the printing range 18 it is positioned opposite the platen 24, as shown in FIG. 5, which is mounted a cover 25 which in turn, closes the roll paper compartment 20. The print head 14 can print to the back of a slip S and is supplied with ink from an ink tank 17 so that the print head 14 can print for a long time without directly replacing the ink.

The print head 14 can print to slips S travelling in the horizontal direction, as well as to roll paper P or slips S moving in a vertical direction as further described below. The print head 14 has multiple nozzles and can print at least one line of text to a slip S travelling in the horizontal direction without moving the carriage 15.

Figure 6:
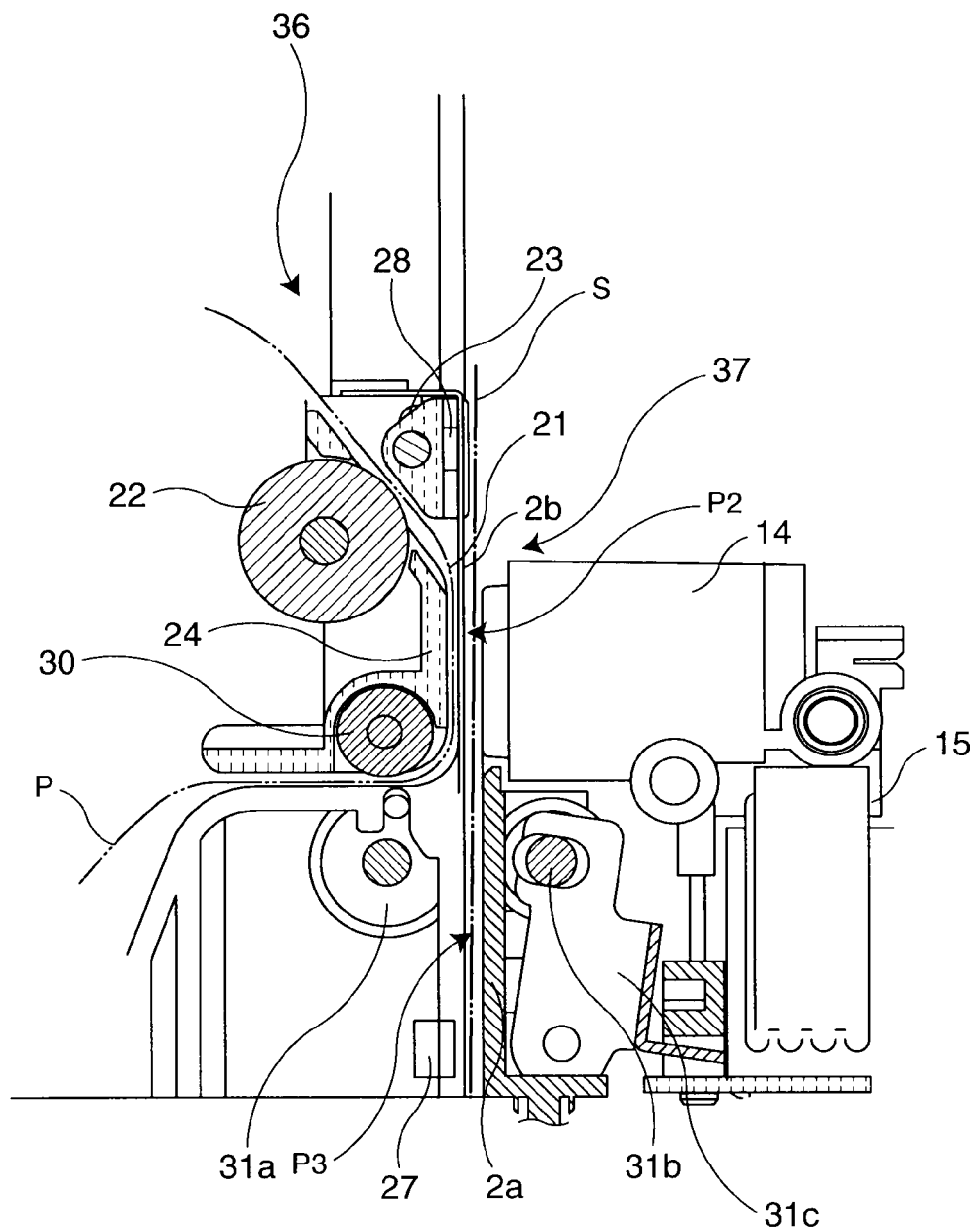
FIG. 6 is an enlarged section view of part of FIG. 5.

A discharge section 4 composed of the discharge rollers 8 is disposed downstream of the print head 14. This discharge section 4 discharges a slip S after printing is completed from outside of the printer 1 by means of discharge rollers 8. A discharge detector 28 as shown in FIG. 6 is disposed near the discharge rollers 8 for confirming whether a printed slip S has been discharged or not. This discharge detector 28 also functions to detect ejection of a slip S conveyed and printed on the third transportation path as further described below. This occurs downstream from the printing range 18 on both the first transportation path P1 and the third transportation path P3.

The height of the outside guide 2a and inside guide 2b, other than at the U-shape bottom 34 where scanners 11, 12 and MICR 13 are located, is equal to a distance of less than the width of the conveyed slip S so that if there is a paper jam, for example, the slip S can be easily and manually be removed from the printing apparatus.

Transporting a slip S through first transportation path P1 is hereinafter described in detail.

The slips S are set by the user in the direction of arrow A into the paper supply part 3 which is aligned with the straight part 35a of the first transportation path P1. The slips S are then conveyed from the paper supply part 3 along the first transportation path P1.

The BOF detector 9 detects the leading edge of the slip S when the leading edge of a slip S reaches the BOF detector 9. If the printer 1 has received a slip S processing command from the host computer (not shown), the drive roller 6a of first transportation rollers 6 starts turning in response to the detection signal from the BOF detector 9. The slip S is thus grabbed smoothly between the drive roller 6a and pressure roller 6b, and is conveyed without slipping by rotation of the drive roller 6a through the first transportation path P1 along the wall of the outside guide 2a around the U-shape bottom 34.

Power supply to the scanners 11, 12 and MICR 13 located downstream from the TOF detector 10 turns on when the leading edge of the slip S conveyed from the first transportation rollers 6 reaches the TOF detector 10. It will be noted that a printer 1 according to this embodiment of the invention is constructed to prevent wasteful consumption of power by supplying power to the necessary parts only when needed, including the drive rollers.

As the slip S is conveyed passed the scanners, scanner 11 disposed on the outside guide 2a side of the path captures an image of the back of the slip S while scanner 12 on the inside guide 2b side of the path captures an image of the front of the slip S. The MICR 13 disposed on the inside guide 2b side also reads any magnetic ink characters preprinted on the slip S.

Image data output from the scanners 11, 12 can be sent to the host computer controlling the printer 1, or it could be processed by a processor in the printer 1 itself.

The captured images could also be presented on a display, improving the efficiency of inspecting the check or other slip S. This display could be the display connected to the host computer, or it could be disposed to the printer 1 itself.

The captured data is then processed by the built-in processor of the printer 1 or by the host computer. A second print medium could also be printed depending on the result of this data process. This second print medium could be roll paper P or a different slip S, such as a validation slip.

When the leading edge of the slip S reaches the second transportation rollers 7 after passing the TOF detector 10, it is grabbed between the drive roller 7a and pressure roller 7b and conveyed by rotation of the drive roller 7a to straight part 35b.

When the slip S passes through the printing range 18 opposite print head 14, the print head 14 prints to the slip S. The outside guide 2a is disposed between the print head 14 and slip S, but there is an opening in the outside guide 2a around the printing range 18. There is, therefore, no obstruction between the print head 14 and slip S.

In this embodiment, the print head 14 is held in the printing range 18 in a predetermined fixed position when it prints to the print medium, that is, to slip S. This occurs by moving the print medium passed the stationary print head 14. When not printing, the print head 14 and carriage 15 are moved to a retracted position 19. By thus retracting the print head 14 when not printing, the slip S being conveyed will not be damaged or soiled by the print head 14. Retracting the print head 14 also reduces the likelihood of the print head 14 causing the slip S to jam.

After the back is printed by the print head 14, the slip S is discharged in the direction of arrow B by discharge rollers 8, and is ejected from the printer 1 by rotation of the drive roller 8a with the slip S held between the drive roller 8a and pressure roller 8b.

Second Transportation Path

The second transportation path P2 is hereinafter described in detail with reference to FIG. 2(a), FIG. 5 and FIG. 6.

A roll paper compartment 20 for holding roll paper P is located between the two straight parts 35a, 35b of the first transportation path P1. One end of the roll paper P is fed from the roll paper compartment 20 into the second transportation path P2 so that the roll paper P may be conveyed along the second transportation path P2.

As shown in FIG. 2(a), FIG. 5, and FIG. 6, the second transportation path P2 is used for conveying roll paper P from the roll paper compartment 20 to the printing range 18, and then discharging the roll paper P. This second transportation path P2 overlaps part of the straight part 35b of first transportation path P1, and lies in a vertical direction substantially perpendicular to the transportation direction of a slip through the first transportation path P1.

As shown in FIG. 6, a second transportation mechanism is associated with the second transportation path P2 is composed of vertical drive rollers 22 for conveying roll paper P in the vertical direction, a vertical pressure roller 23 for pressing roll paper P to the vertical drive rollers 22, and a tension roller 30 for applying specific tension to the roll paper P exposed in the printing range 18.

As shown in FIG. 5, these vertical drive rollers 22 are mounted at the distal end of the cover 25 which opens and closes the roll paper compartment 20.

The platen 24 and print head 14 are positioned along the printing range 18 and disposed on opposite sides of the second transportation path P2 between the vertical drive rollers 22 and vertical pressure roller 23 and the tension roller 30.

A roll paper exit 36 for discharging the roll paper P is opened above the vertical drive rollers 22 and vertical pressure roller 23, and a cutter 26 for cutting the roll paper P is disposed near the roll paper exit 36.

Transporting of roll paper P through the second transportation path P2 is hereafter described in detail.

The leading edge of the roll paper P pulled out from the roll paper compartment 20 passes tension roller 30 and platen 24, and is loaded between the vertical drive rollers 22 and vertical pressure roller 23. The roll paper P is transported vertically through the second transportation path P2 by rotation of the tension roller 30, vertical drive rollers 22, and vertical pressure roller 23. The roll paper P is printed to by the print head 14 as the roll paper P passes the print head 14 when juxtaposed opposing printing range 18.

The print head 14 travels in a horizontal direction by way of carriage 15 to print one line on the roll paper P. To print multiple lines, the vertical drive rollers 22 are driven to advance the paper vertically by one line after the printing of one line ends, and the print head 14 again travels horizontally to print the next line.

The tension roller 30 maintains a specified tension on the roll paper P between the vertical drive rollers 22 and vertical pressure roller 23 so that the roll paper P is conveyed passed the printing position without slack.

The roll paper P is then transported further vertically and discharged externally to the printer 1 from the roll paper exit 36. The discharged roll paper P is then cut by the cutter 26 disposed near the roll paper exit 36.

Print data received from the host computer is printed to the roll paper P. In addition to print data received from the host, data read by the scanners 11, 12 or MICR 13 could be printed or processed and then printed to the roll paper P. More specifically, the printer 1 can also print to the roll paper P based on data acquired by the printer 1. The entire processing operation can therefore be completed quickly.

Printing to a slip S may occur when a slip is travelling along the first transportation path P1 or along the third transportation path P3 as shown in FIG. 2(b) which lies parallel to the roll paper transportation path P2. The presence of a slip S between the roll paper and print head 14 can be confirmed by the discharge detector 28 or by a validation detector 27 as hereafter described. This eliminates the danger of printing print data which should be printed on a slip S from being printed on roll paper P. Furthermore, when it is necessary to print to roll paper P the roll paper P can be printed on immediately after this intervening slip S passes by or is removed, thereby improving efficiency.

Third Transportation Path

The third transportation path P3 is hereafter described next with reference to FIG. 2(b) and FIG. 6.

The third transportation path P3 is a transportation path for conveying a validation slip S inserted between the outside guide 2a and inside guide 2b from a top opening 37 formed between the outside guide 2a and inside guide 2b near the printing range 18. This third transportation path P3 includes part of the second transportation path P2. The transportation direction of the third transportation path P3 is also substantially perpendicular to the conveyance direction of a slip through the first transportation path P1. The third transportation path P3 and second transportation path P2 are therefore both vertical conveyance paths perpendicular to the first transportation path P1.

Vertical discharge rollers which include validation drive rollers 31a and opposing validation pressure rollers 31b are disposed on opposite sides of the third transportation path P3. The validation drive rollers 31a are located below the platen 24 and tension roller 30 for transporting a slip S vertically through the third transportation path P3. The validation drive rollers 31a and vertical drive rollers 22 for conveying roll paper P are selectively driven by a single vertical paper feed motor (not shown) hereinafter referred to as the VF motor. That is, the validation drive rollers 31a and vertical drive rollers 22 are selectively connected to the VF motor by a clutch not shown. In this embodiment, drive power from the VF motor is transferred to the validation drive rollers 31a or vertical drive rollers 22 by moving the carriage 15 to predefined positions.

As shown in FIG. 6, the validation pressure rollers 31b are mounted to the distal end of a rotary arm 31c. An actuator (not shown) is driven to turn the rotary arm 31c, thereby setting the validation pressure rollers 31b to the closed position (transportation position) in contact with the validation drive rollers 31a, or to the open position (retracted position) separated from the validation drive rollers 31a. The validation pressure rollers 31b are held in the retracted position when the slip S is transported along the first transportation path P1 or is inserted from above into the third transportation path P3.

A validation detector 27 for sensing a slip S inserted into the third transportation path P3 is disposed near the bottom of the third transportation path P3. As shown in FIG. 3, a positioning guide 29 for inserting a validation slip S to the third transportation path P3 is disposed to the junction of the straight part 35b of first transportation path P1 and U-shape bottom 34. This validation detector 27 is used to confirm whether a slip S has been inserted in a predefined position. More specifically, the validation detector 27 detects if a slip S has been inserted along the positioning guide 29 and directed toward the bottom of the third transportation path P3. When a slip S is inserted into the third transportation path P3, the slip S is also detected by discharge detector 28. By thus using two detectors 27 and 28 disposed on opposite sides of the printing range 18, slip forms of a predetermined size can be inserted, and slips smaller than an allowed size can be prevented.

Validation printing to a check or a validation slip S using the third transportation path P3 is described next. A slip S is inserted from top opening 37, into the validation transportation path, that is, the third transportation path P3. The slip S is inserted directed to the bottom of the third transportation path P3 without interference from validation drive rollers 31a or validation pressure rollers 31b. The pressure roller 8b of discharge rollers 8 is held in the retracted position at this time with the slip S inserted directed toward the bottom of the third transportation path P3 without interference from the discharge rollers 8.

If the validation detector 27 detects that a slip S has been inserted into the third transportation path P3 and a validation printing command has been received by the printer 1 from the host computer, the validation pressure rollers 31b move from the retracted position to the transportation position so that the slip S is held between the validation pressure rollers 31b and validation drive rollers 31a. The discharge detector 28 simultaneously detects the presence of the slip S. The validation pressure rollers 31b move from the retracted position to the transportation position only if a slip S is detected by both the validation detector 27 and discharge detector 28. If the slip S is detected by only one of these detectors 27, 28, an error is indicated by means such as, e.g. LEDs (not shown) thereby telling the user that the slip S is not properly loaded.

Figure 7:
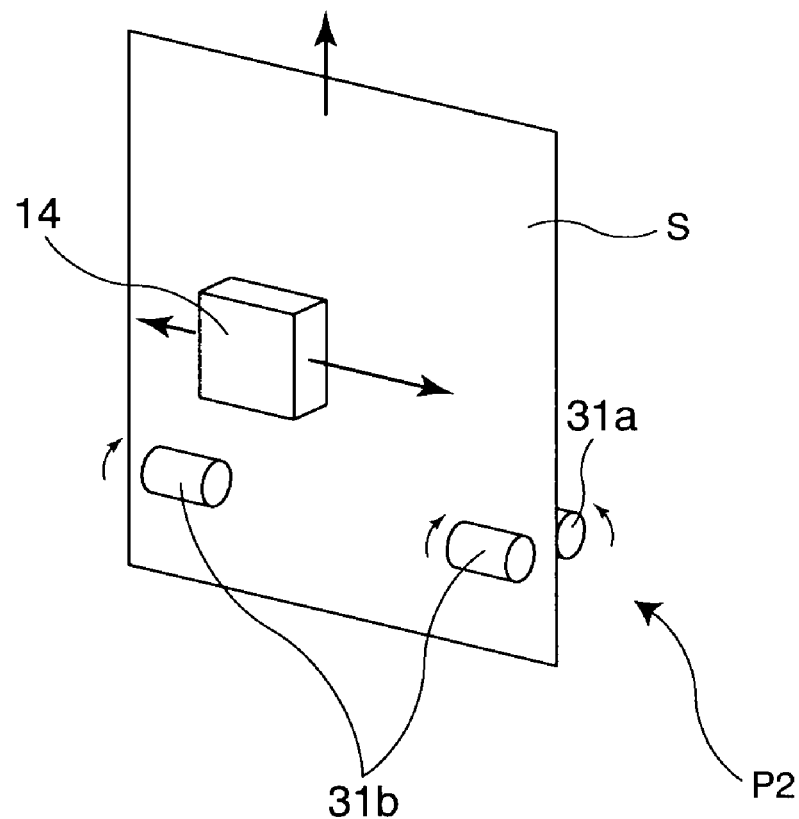
FIG. 7 shows form transportation on the second transportation path or third transportation path.

The carriage 15 is then moved horizontally (in parallel to the first transportation path) as shown in FIG. 7 and the print head 14 prints to the slip S held between the validation pressure rollers 31b and validation drive rollers 31a. One line is thus printed to a predetermined position (a fixed distance from the bottom of third transportation path P3 and within the printing range 18) from the bottom edge of the slip S. To print another line, the validation drive rollers 31a are driven to advance the slip S up one line, and the carriage 15 is then driven horizontally again while the print head 14 prints the next line.

When printing ends the slip S is transported further upward until it is released from the validation pressure rollers 31b and validation drive rollers 31a so that the user can remove the slip S exposed from the top opening 37. Removal of the slip S by the user is also confirmed by discharge detector 28 output. This completes the slip S validation printing process.

By having a U-shaped first transportation path P1 whereby an inserted slip S makes a U-turn and is discharged in the same direction from which it was inserted, the user can easily insert a slip S to a printer 1 according to this embodiment of the invention and then easily remove the ejected slip S after specific processes have been completed along the transportation path while remaining seated.

Furthermore, by having a first transportation path P1 and an intersecting second transportation path P2, roll paper used for printing receipts, for example, can be housed between the straight sections of the U-shaped transportation path, and the user can therefore also easily print and remove receipts while remaining seated.

Yet further, a separate slip S for validation (a validation slip) can also be inserted as needed to a third transportation path P3 for validation printing while remaining seated.

The printing apparatus of this invention thus greatly improves job efficiency compared with conventional printers.

When, for example, an endorsement or other information must be printed to a check processed on the first transportation path P1, this embodiment of the invention enables the user to immediately continue processing the check without leaving his seat. Furthermore, information read from the check can also be fed back for printing to the check.

To summarize, a printer 1 according to this embodiment of the invention has a U-shaped first transportation path P1, a first transportation mechanism for conveying and discharging a slip S corresponding to a first print medium on the first transportation path P1, a second transportation path P2 or third transportation path P3 substantially perpendicular to and intersecting the first transportation path P1, a second transportation mechanism for conveying and discharging roll paper P corresponding to the second print medium on the second transportation path P2 or another slip S corresponding to the second print medium on the third transportation path P3, and a single print head 14 for printing to the first print medium or to the second print medium at a particular printing position on the first transportation path P1 and in a commonly aligned position on the second or third transportation paths P2, P3.

Furthermore, because the first transportation path P1 in this embodiment is U-shaped and the first print medium when inserted into the first transportation path P1 of the printer 1 makes a U-turn through the first transportation path P1, the printed print medium will be discharged from the first transportation path P1 at a location near where it was inserted. The person using this printer 1 can therefore load and remove print media from this printer 1 while remaining seated.

The second transportation path P2 (and third transportation path P3) which conveys the second print medium is arranged substantially perpendicular to the first transportation path P1, which conveys the first print medium. In addition, the second transportation path P2 (or third transportation path P3) are disposed inside the U-shaped first transportation path. The both of first and second print medium are printed with the same print head at the intersecting location between the second transportation path P2 (or third transportation path P3) and the first transportation path P1, two printing functions can therefore be achieved with a single printer.

The print head 14 in this embodiment has a carriage 15 that travels bidirectionally between the printing range 18 and a retracted position 19 separated a specific distance from the printing range 18.

The print head 14 is held in the retracted position 19 when not printing, thereby preventing damage and soiling of the print head 14 as well as avoiding the danger of paper jams caused by interference between the print medium and print head 14.

A printer 1 according to this embodiment of the invention also has a MICR 13 disposed to at least one side of the first transportation path P1 for reading magnetic ink characters preprinted to the first print medium.

In addition to printing, the printer 1 according to this embodiment of the invention can therefore also use the MICR 13 to read magnetic ink information recorded on the first print medium, which is a slip S such as a check, as it is conveyed through the U-shaped first transportation path P1. The printer 1 can send the magnetic ink character data thus acquired to a host computer to internally process the data by means of an internal processing unit (not shown) and can feed the data back to a subsequent printing operation.

A printer 1 according to this embodiment of the invention also has image scanning means (scanners 11, 12) for capturing images of the slip S disposed along the first transportation path P1.

In addition to printing a slip S and reading magnetic ink character information therefrom using the MICR 13, this printer 1 can therefore capture images of the slip S using scanners 11, 12 disposed on opposite sides of the first transportation path. This data can be processed in the same way as data captured by the MICR 13, and the images can be presented on a display to, for example, improve check processing efficiency.

The print head 14 of this printer 1 is also described as being an inkjet print head. While the invention should not be so limited an inkjet printer is ideally suited to the present invention using a print media on a first transportation path P1 and an intersecting different second transportation path P2 (or third transportation path P3) with a single print head for printing to the print media for each path.

The first print medium shall also not be limited to any type of paper media such as check slips S or validation slips S. When the slips S are checks as described in the present embodiment and are processed using multiple printers, however, the checks can become mixed up and out of sequence, making handling difficult. Processing the slips S in a single printer 1 eliminates this problem and enables more efficient slip processing.

A slip S can also be printed to using the third transportation path P3. After a check passes the first transportation path P1 and is scanned and endorsed, it may be necessary, for example, to print additional information on the back thereof. A printer 1 according to this embodiment of the invention eliminates the need to use a separate printer in such cases, and can print as needed using feedback based on the acquired data by transporting the check through the third transportation path P3. More efficient check processing with fewer operator errors is therefore possible compared with the prior art.

Furthermore, a slip S inserted in the printer as the second print medium from the discharge side of the third transportation path P3 can be transported by the second transportation mechanism to the printing position, printed by the print head 14, and then discharged by the second transportation mechanism from the third transportation path P3. A printer 1 according to this embodiment of the invention can therefore also be used for validation printing using this third transportation path P3. A separate printer has conventionally been used for validation printing. The printer 1 of this invention, however, can also be used for validation printing, for which data acquired from the processed slip S can be used. Such problems as print medium handling errors, data entry errors, and work delays can therefore be eliminated.

This printer 1 can also use a continuous print medium wound into a roll (i.e., roll paper) as the second print medium. Conventionally, receipts have been heretofore printed on a separate printer, leading to such problems as data entry errors and work delays. By transporting roll paper P through a second transportation path P2 and printing to and discharging this roll paper P as a receipt, however, a single printer 1 according to this embodiment of the invention can be used instead for more efficient check processing.

Slip Form Printing Modes

A print head 14 according to this embodiment of the invention is mounted on a carriage 15 and is movable horizontally through the printing range 18 along the straight part 35b of the first transportation path P1. There are, therefore, two basic ways of printing to a slip S travelling on the first transportation path P1: a stationary slip printing mode in which the slip S is held stationary and the print head 14 is moved horizontally while printing, and a stationary print head printing mode in which the print head 14 is held stationary and prints to a slip S travelling horizontally.

In the stationary print head printing mode the position of the print head 14 is fixed and ink is ejected from the print head 14 to print to a slip S travelling in front of the print head 14.

It is not necessary to temporarily stop the slip S in this stationary print head printing mode, that is, when the print head 14 is stationary and the slip S is moved while printing. Printing can therefore be completed in the stationary print head printing mode without reducing the speed of the slip S transported from the U-shape bottom 34. More specifically, the stationary print head printing mode enables high speed slip S processing because the feed rate of the slip S does not drop.

Figure 8A:
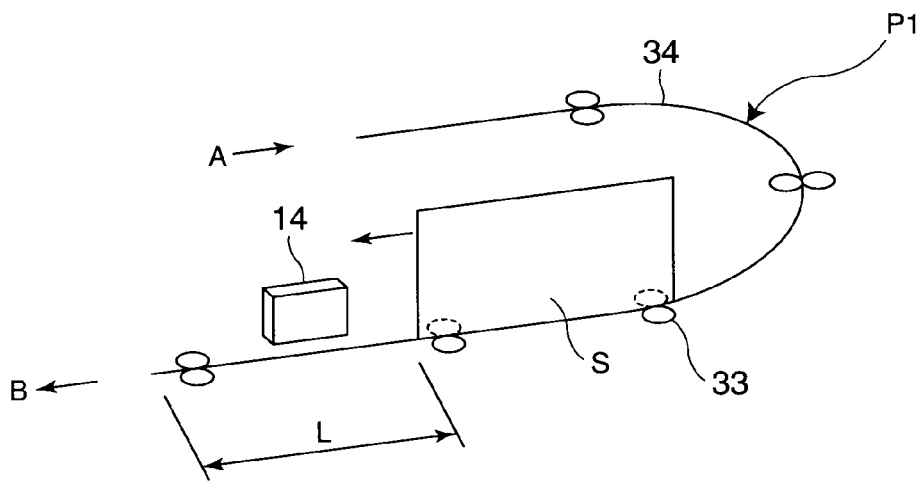
FIG. 8(a) is a schematic diagram showing the first transportation path when the print head is stationary.
Figure 8B:
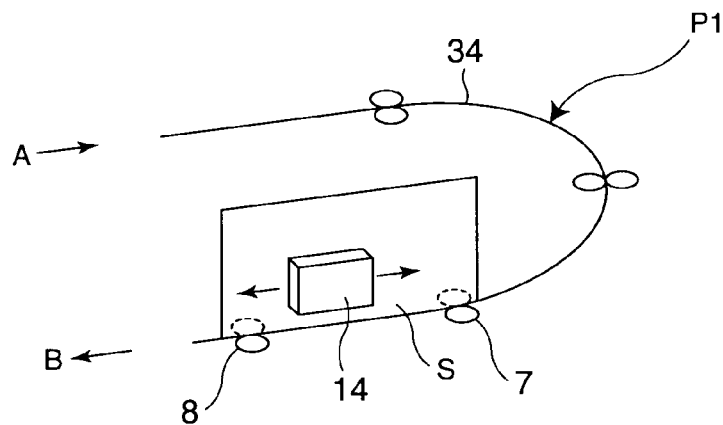
FIG. 8(b) is a schematic diagram showing the first transportation path when the print head is movable.

In the stationary slip printing mode, however, the slip S is paused before the print head 14 as shown in FIG. 8(b), and the slip S is printed by moving the print head 14 on the carriage 15 parallel to the transportation direction of the slip S while ejecting ink.

This stationary slip printing mode can be used effectively for printing based on the image data or magnetic ink character data acquired when the slip S passed through the U-shape bottom 34.

As shown in FIG. 8(a), if the print data is generated using the image data or magnetic ink character data acquired when the slip S passes the U-shape bottom 34 then the stationary print head printing mode of operation requires, the slip S to be paused on the downstream side of the exit from the U-shape bottom 34, or more precisely, downstream from the position where magnetic ink character reading by the MICR 13 is completed. In this case the print head 14 must be located at or after the position where slip S transportation stabilizes after the image data or magnetic ink character data is processed before transporting the slip S resumes. Therefore, when in the stationary print heat printing mode if printing is to be based on obtaining image data or magnetic ink character data as explained above, the length of the straight part 35b should be increased by length L shown in FIG. 8(a) compared with the length of the path when printing is not based on this data. However, increasing the length of straight part 35b is undesirable, because a longer transportation path makes it harder to install the printer 1 in the extremely limited space available at a bank teller window, for example.

In the stationary slip printing mode shown in FIG. 8(b), the slip S is held stationary and printed by moving the print head 14 parallel to the transportation direction of the slip S by means of carriage 15. In this case the same function described with reference to FIG. 8(a) above can be achieved using a transportation path of exactly the same length as a conventional transportation path that does not stop slip S transportation.

More specifically, slip S transportation is stopped when the trailing edge of the slip S passes out of the U-shape bottom 34 and enters the straight part 35b. The slip S can be transported in this way by, for example, using form detection by the discharge detector 28, which is disposed at the end of the printing range on the discharge rollers 8 side, as a trigger and stopping slip S transportation when the leading edge of the slip S reaches the discharge detector 28. Other methods could also be used, including, for example, detecting the trailing edge of the slip S.

If a read error is indicated by a scanner 11, 12 or the MICR 13 when in the stationary slip printing mode, transporting the slip S can be resumed and the slip S ejected without printing by the print head 14. This prevents such problems as printing an invalid endorsement when the slip S is a check, for example.

Results of processing data read from the check or visually inspecting the scanned images presented on a display can also be fed back for printing when in the stationary slip printing mode.

The present embodiment is described stopping either the slip S or print head 14 and moving the other in order to print to a slip S, but it will obviously be possible to print while simultaneously moving both the slip S and print head 14. More particularly, the fastest printing can be achieved by moving the print head 14 in the opposite direction while advancing the slip S to the discharge section 4. This is particularly effective for rapidly processing slips S in a rush.

A printer 1 according to this embodiment of the invention can thus select a printing mode in which the print head 14 is stationary or is moved parallel to the transportation direction of the print medium while printing. Furthermore, when the print head 14 is moved parallel to the transportation direction of the print medium, printing modes that are conventionally not possible can be achieved.

More specifically, a printer 1 according to this embodiment of the invention can print by stopping the print medium and moving the print head 14 on a carriage 15 parallel to the transportation direction of the print medium. When a conventional stationary print head is used and the print medium is first paused before printing, the print head must be located downstream from where transporting the stopped print medium resumes, and the transportation path must extend further. A printer according to this embodiment of the invention, however, can stop and then print to the print medium without lengthening the conventional transportation path. The printing apparatus therefore uses space effectively and does not wastefully occupy space, a particular advantage for installation at a bank teller window and other locations where installation space and working space are limited.

Selecting the Transportation Direction for Slip Discharge

A printing apparatus according to the present invention can also be configured to change the transportation direction of the slip S travelling along the first transportation path P1 according to the data read by the scanners 11, 12, MICR 13, or other data reader.

An embodiment of the invention that changes the transportation direction of the slip S according to detector output is described below.

Based on output from the scanners 11, 12 and MICR 13, a printer 1 according to this embodiment of the invention determines at the straight part 35b of the first transportation path P1 whether to discharge the slip S in the direction of arrow B (see FIG. 1), that is, in the same direction as the transportation direction to that point, or in the direction of arrow C (see FIG. 1), that is, substantially perpendicularly to the transportation direction to that point.

A first discharge means, which is composed of the discharge section 4 where the discharge mechanism of discharge rollers 8 shown in FIG. 3 and FIG. 4 is disposed, ejects slips in the direction of arrow B. A second discharge means, which is composed of a vertical transportation path (equivalent to third transportation path P3) and discharge mechanism of vertical discharge rollers 31 shown in FIG. 3, ejects slips in the direction of arrow C.

Independent of the slip S is ejected by the first discharge means or the second discharge means, the slip S can be printed to when it is positioned opposite the print head 14 in the printing range 18. It is also possible to disable printing when the print medium is ejected in a particular direction, either in the direction of arrow B or arrow C. In this embodiment, the print head 14 is stationary and the slip is moving during printing. However, this embodiment could also be configured to print with the print head 14 moving.

When a slip S is transported from the paper supply part 3 and the leading edge of the slip S is grabbed by the discharge rollers 8 and passed from the second transportation rollers 7 to the discharge rollers 8, the discharge detector 28 disposed near the discharge rollers 8 detects the paper. Based on the detection signal output from the discharge detector 28, transporting the slip S may then be stopped or the discharge means for ejecting the slip S may be selected.

Selecting the discharge means is based on whether a read error was generated by the scanners 11, 12 or MICR 13, or some other error was detected in the read data. A processor disposed to the printer 1 preferably makes this determination, but a configuration in which an external host computer selects the discharge means is also possible.

Figure 9A:
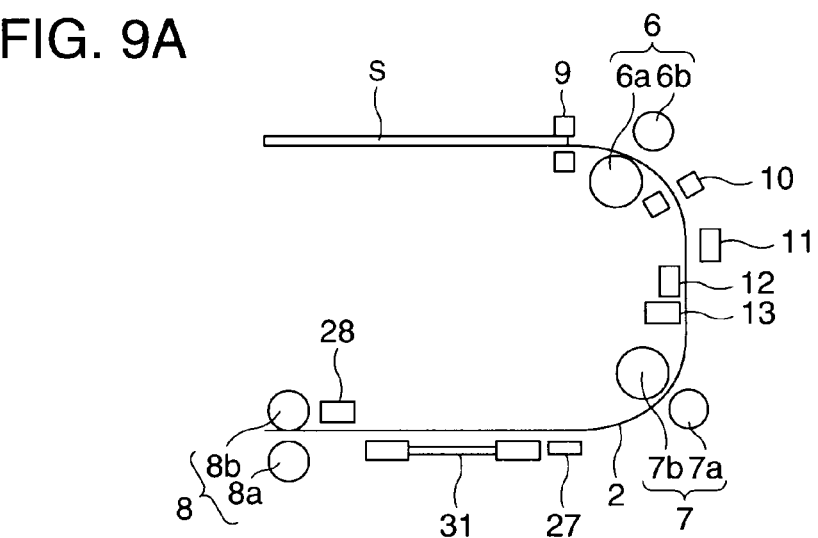
FIGS. 9(a-c) schematically shows operation from supplying a slip to the paper supply part to selection of the discharge means.
Figure 9B:
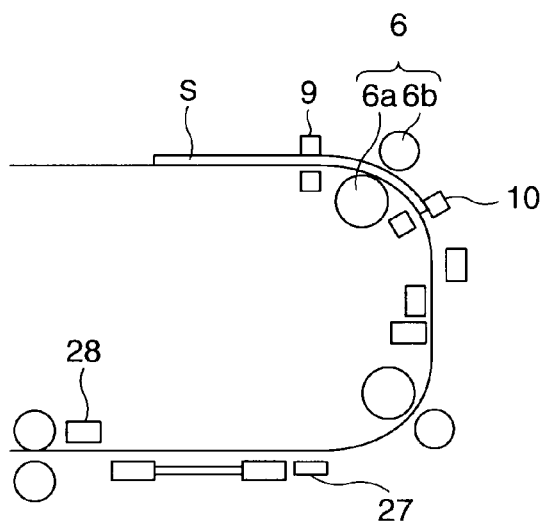
Figure 9C:
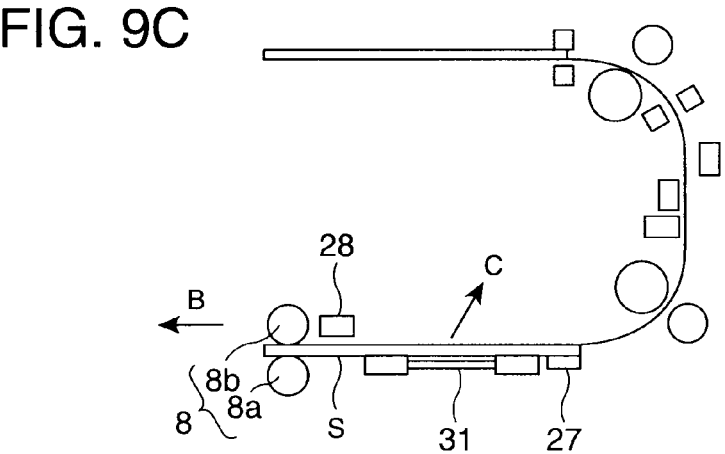

FIG. 9(a) to FIG. 9(c) schematically show the movement of the slip S from when it is supplied by the paper supply part 3 to when the discharge means is selected.

FIG. 9(a) shows the slip S delivered by the paper supply part 3 through the first transportation path to the point of discharge. When the slips S are manually inserted, the motor driving the first transportation rollers 6, second transportation rollers 7, and discharge rollers 8 start in response to a signal from the BOF detector 9 whereas the drive motor starts in response to a signal from the ASF detector (not shown) when the stock of slips S are supplied one at a time by an auto-feeder.

FIG. 9(b) shows the slip S conveyed by the first transportation rollers 6 to the position where the leading edge of the slip S is at the TOF detector 10. A signal from this TOF detector 10 starts the power supply to the scanners 11, 12 and MICR 13. The position of the slip S can then be managed based on the number of motor steps driven. This also applies to the other embodiments.

In FIG. 9(c) the slip S has separated from the second transportation rollers 7 and been grabbed by the discharge rollers 8. The slip S is detected by the discharge detector 28 here and the slip ejection direction is selected.

If no read errors are returned by the scanners 11, 12 or MICR 13 and there are no data errors detected, the slip S is discharged in the direction of arrow B, that is, in the same direction as the slip was conveyed to that point. If a read error is returned by the scanners 11, 12 or MICR 13 or a data error is detected, the slip S is ejected in the direction of arrow C, that is, substantially perpendicularly to the transportation direction to that point.

The slip S is discharged in the horizontal direction by the discharge rollers 8, that is, drive roller 8a and pressure roller 8b, and is discharged in the vertical direction by the vertical discharge rollers 31, that is, validation drive rollers 31a and validation pressure rollers 31b shown in FIG. 3.

As described above, the validation pressure rollers 31b can be set to a closed position (transportation position) in contact with the validation drive rollers 31a, or to an open position (retracted position) separated from the validation drive rollers 31a. The validation drive rollers 31a are disposed slightly offset from the transportation line of the slip S, and when in the open positions are positioned so that there is no contact with the slip S. The pressure roller 8b of the discharge rollers 8 can also be set to a closed position (transportation position) contacting the drive roller 8a, or to an open position (retracted position) separated from the drive roller 8a.

When in the closed position the validation pressure rollers 31b are urged to the validation drive rollers 31a by spring force so that the slip S is held between the validation drive rollers 31a and validation pressure rollers 31b.

The above-noted offset from the media transportation line is very slight in this embodiment so that there is no interference with grabbing the leading edge of the slip S or conveying the slip S.

The default state when the discharge direction is selected is with the discharge rollers 8 in the closed position and the vertical discharge rollers 31 in the open position.

If there are no data read errors or data errors, a command is output to hold the discharge rollers 8 in the closed position and the vertical discharge rollers 31 in the open position. The slip S is therefore transported by the discharge rollers 8 and not touched by the vertical discharge rollers 31.

When the slip S passes the printing range 18 the slip S can be printed by the print head 14 or discharged without printing. Transporting the slip S then continues and the slip S is ejected in the direction of arrow B.

If a data read error occurs or a data error is detected, a command is output to move the discharge rollers 8 from the closed position to the open position, and transportation in the horizontal direction stops. The vertical discharge rollers 31 are then controlled to move from the open position to the closed position and hold the slip S. The slip S is then transported vertically by the vertical discharge rollers 31 and ejected in the direction of arrow C without contacting the discharge rollers 8.

The slip S can be printed using the print head 14 when the slip S is proximally opposite the print head 14. It should be noted that multiple lines can be printed by conveying the slip S upward, but multiple lines cannot be printed by a conventional printer having only a horizontal transportation path. Compared with a conventional printer, more information can therefore be printed on the slip S.

Figure 10:
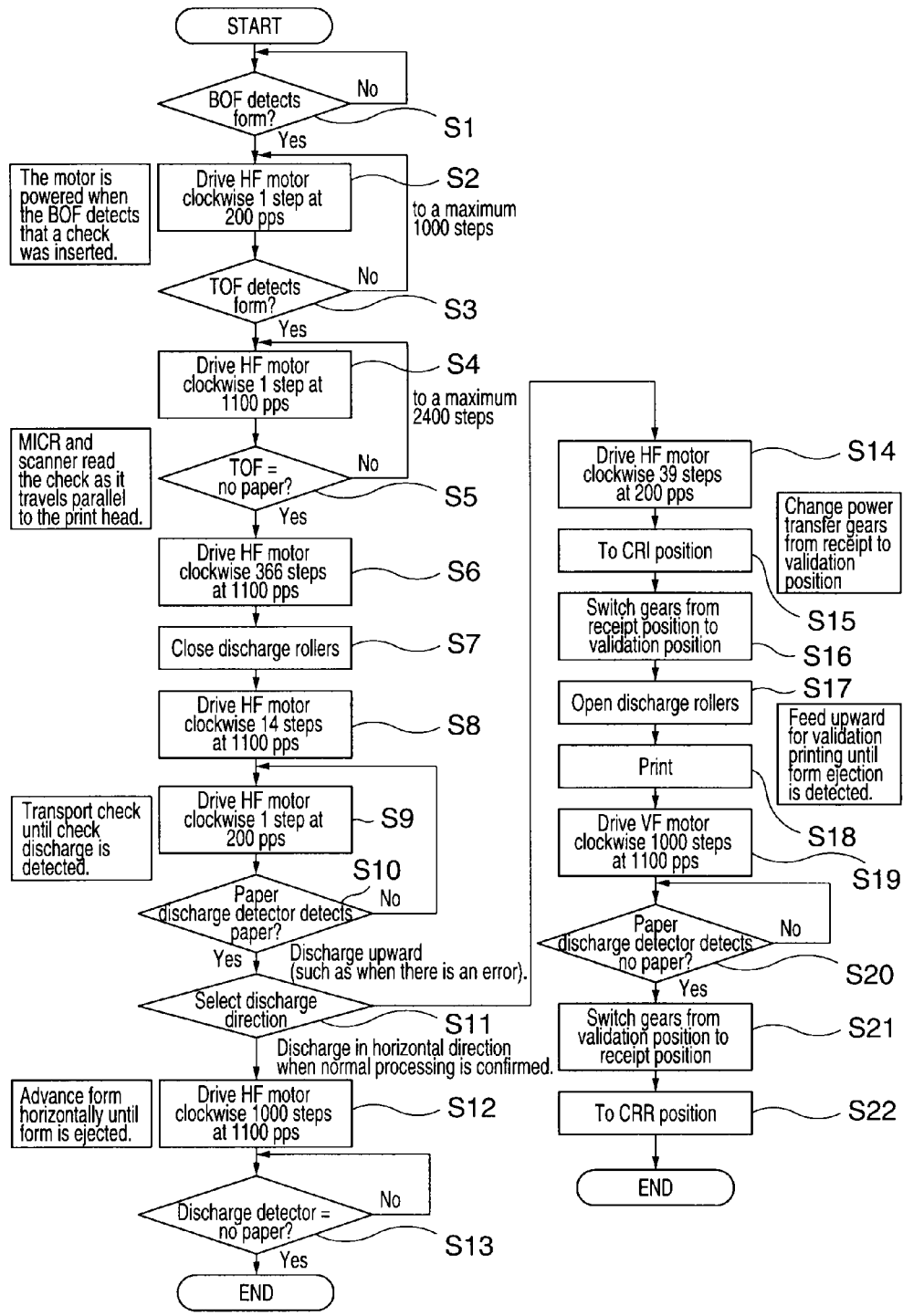
FIG. 10 is a flow chart of the control process from supplying a slip to the paper supply part to discharge in a specific discharge direction.

FIG. 10 is a flow chart of the control process from supplying a slip S from the paper supply part 3 to ejecting the slip S in a specified discharge direction.

Steps connected by arrows in FIG. 10 denote primarily transportation and discharge roller control. The boxes (with no lines connected thereto) shown adjacent to these steps indicate other actions performed in the steps.

When the printer 1 receives a slip S processing command from the host computer and a slip S is inserted, the BOF detector 9 looks for the slip S and starts the HF motor 40 when the slip S is detected. The slip S is then transported by the transportation mechanism, and power is supplied to the scanners 11, 12 and MICR 13 when the TOF detector 10 detects the slip S. The transportation position of the slip S is thereafter managed by controlling the steps advanced by the HF motor 40.

Step S1 to S5

If the TOF detector 10 does not detect the leading edge of the slip S even after the motor is driven a specified number of steps (1000 steps in this example) between step S2 and step S3, the motor is stopped and a "form feed error" is reported to the user by means of LEDs not shown, for example. Likewise, if the TOF detector 10 does not detect the trailing edge of the slip S between steps S4 and S5 even though the motor is driven a specified number of steps (2400 steps in this example), the motor is stopped and a "form feed error" is reported to the user. Note, also, that the feed rate of the slip S differs before and after the leading edge of the slip S is detected (step S2). More specifically, the HF motor 40 is driven at 200 pps (pulses per second) in step S2 and at 1100 pps in step S4 in the present embodiment.

After the TOF detector 10 detects the trailing edge of the slip S (step S5), the HF motor 40 is driven a specified number of steps (366 steps at 1100 pps) (step S6), and a command setting the discharge rollers 8 to the closed position is asserted (step S7). The slip S is then advanced while data is acquired therefrom by the scanners 11, 12 and MICR 13 until the slip S is detected by the discharge detector 28. When the discharge detector 28 detects that the leading edge of the slip S has reached the discharge detector 28 (step S10), the discharge direction is selected (step S11).

If the scanners 11, 12 and MICR 13 return no data read errors and no data errors are detected, the slip S continues to be conveyed until it is ejected in the direction of arrow B. The slip S has been ejected from the printer 1 in this preferred embodiment when the discharge detector 28 detects that the trailing edge of the slip S has passed, and the process therefore ends (steps S12, S13).

If there is a data error or the scanners 11, 12 or MICR 13 return a data read error, the HF motor 40 is reversed a specified distance (39 steps) to back the slip S up slightly (step S14). The carriage 15 is then moved to the CRI position, and a clutch is operated so that power from the VF motor is transferred to the validation drive rollers 31a instead of the vertical drive rollers 22 for transporting roll paper (step S16). The position of the discharge rollers is then also switched to the vertical discharge direction.

More specifically, the discharge rollers 8 are set to the open position and the vertical discharge rollers 31 are set to the closed position (step S17). The slip S is then printed with the print head 14 while being conveyed upward (step S18). When the slip S is conveyed further upward (step S19), the slip S separates from the validation pressure rollers 31b and validation drive rollers 31a, and the user can remove the slip S exposed from the top opening 37. Removal of the slip S by the user is confirmed by discharge detector 28 output (step S20), causing the clutch to be changed again to transfer VF motor power to the vertical drive rollers 22 for transporting roll paper and resetting the rollers to the normal position for horizontally ejecting slips (steps S14 to S22). The process then ends.

When this embodiment of the invention is used for processing checks at the teller window in a bank, for example, the U-shape of the slip transportation path enables the teller to easily insert checks (slips S) to and remove processed checks from the printer 1 while remaining seated.

Furthermore, when a read error is reported by the scanners 11, 12 or MICR 13, or a data error is detected, the slip is automatically ejected upward, a different direction from the conventional horizontal transportation direction. The operator thus immediately knows that a problem occurred and can respond quickly and appropriately.

Yet further, by selectively changing the transportation direction according to the read results when continuously processing multiple checks, problem checks are easily identified and effectively prevented from mixing with the other checks.

Some typical applications of the present invention are described next below.

In this first application transporting a slip S always stops near where the leading edge of the form is detected by the discharge detector 28, regardless of whether the detectors return a read error or a data error is detected. The read data is processed while form transportation is stopped, or the scanned images of the medium are presented on a display for visual inspection of the date and signature.

If there is a problem, the form is then ejected horizontally using the first discharge means without printing. If there is not a problem, the check is endorsed by the print head and then ejected vertically using the second discharge means.

This method feeds back the data read from the check for endorsement printing, and prevents the conventional problem of an invalid endorsement being printed and, as a result, the back of the check being printed multiple times.

In this embodiment of the invention the discharge direction of the slip S used as the print medium can be selected according to predefined conditions. Print media can therefore be identified according to preset conditions and grouped accordingly. Furthermore, if another transportation device is disposed to each paper exit, the print media can be delivered to different locations according to specific conditions. For example, if identification marks are printed on the print medium, these can be used to direct where the print medium is delivered.

Yet further, if the MICR 13 or scanners 11, 12 output a read error or a data error is detected, this embodiment of the invention can eject the print medium without changing the transportation direction, change the transportation direction and eject the medium vertically, or select the discharge means and eject the medium according to defined conditions. Problem print media can therefore be ejected from a different form exit for easy identification and processing.

If multiple print media are processed continuously and uniformly discharged from the same form exit, both good media and problem media will become mixed and separating the good and problem media becomes very difficult. The present embodiment is particularly effective in such cases because it eliminates this problem.

Other Embodiments

Alternative embodiments of the present invention are hereafter described with reference to the figures.

Printer Overview

FIG. 11 is a plan view showing a printing apparatus 101 according to this embodiment of the invention. This printing apparatus 101 is a document processing system having an S-shaped transportation path, and is described using a check 103 as the document (slip form) conveyed through this transportation path. The printing apparatus 101 has a loading unit 104 for storing a preloaded stock of checks 103 to be processed and supplied to the transportation path 102, which is S-shaped and a storage unit 105 for storing the processed checks 103 conveyed over the transportation path 102.

The S-shaped transportation path 102 is composed of an outside guide 102a an inside guide 102b and a transportation part 102c between the inside and outside guides. A check 103 is supported by both guides 102a and 102b as it is conveyed through the horizontally disposed transportation part 102c. Starting from the check insertion entrance side and continuing in the check 103 transportation direction, the transportation path 102 includes a first curved transportation path 102d connected to the loading unit 104, a first straight transportation path 102e connected to the first curved transportation path 102d, and both a second curved transportation path 102f and second straight transportation path 102g connected to the first straight transportation path 102e. The first curved transportation path 102d and second curved transportation path 102f each have a straight part connected to a curved part that bends 90 degrees, and then another curved part bending another 90 degrees connected to the opposite end of the straight part. The transportation direction of a check 103 traversing curved transportation path 102d or 102e therefore changes 180 degrees.

The devices disposed to this printing apparatus 101 are hereafter described following the flow of a check 103 transported through this transportation path. One or more checks 103 are inserted from the direction of arrow E to the loading unit 104. Checks 103 loaded in the loading unit 104 are then supplied into the transportation path 102 by rotation of the paper feed roller 130. Operation of the paper feed roller 130 is controlled by the user pressing a button, for example, or by a controller. The paper feed mechanism has a hopper 131 that pushes the stocked checks 103 to the paper feed roller 130, and a pad 132 that works so that of the multiple checks 103 in the hopper 131 only the first check contacting the paper feed roller 130 is fed into the transportation path 102. This is described in further detail below.

The check 103 supplied to the transportation path 102 is then conveyed by the first transportation rollers 106 into the first curved transportation path 102d. The first transportation rollers 106 include a drive roller 106a and pressure roller 106b. The drive roller 106a is driven by a horizontal paper feed motor not shown, and the pressure roller 106b is urged to the drive roller 106a by spring force.

A scanner 111 for capturing an image of the back of the check 103, a scanner 112 for capturing an image of the front of the check 103, and an MICR 113 for reading magnetic ink character data preprinted on the check 103, are disposed to the first curved transportation path 102d and read data from the check 103 as it travels passed. The captured data can be sent to an internal controller of the printing apparatus 101 for processing, or sent to an external host computer for processing.

The check 103 is then grabbed by the second transportation rollers 107 and conveyed to the first straight transportation path 102e. Like the first transportation rollers 106, the second transportation rollers 107 include a drive roller 107a and pressure roller 107b, the drive roller 107a being driven by a motor not shown and the pressure roller 107b urged by spring force to the drive roller 107a.

A print head 110 is disposed along the first straight transportation path 102e for printing an endorsement on the check 103. The check 103 passes a juxtaposed position opposite the print head 110, and then reaches the discharge rollers 108.

Figure 11A:
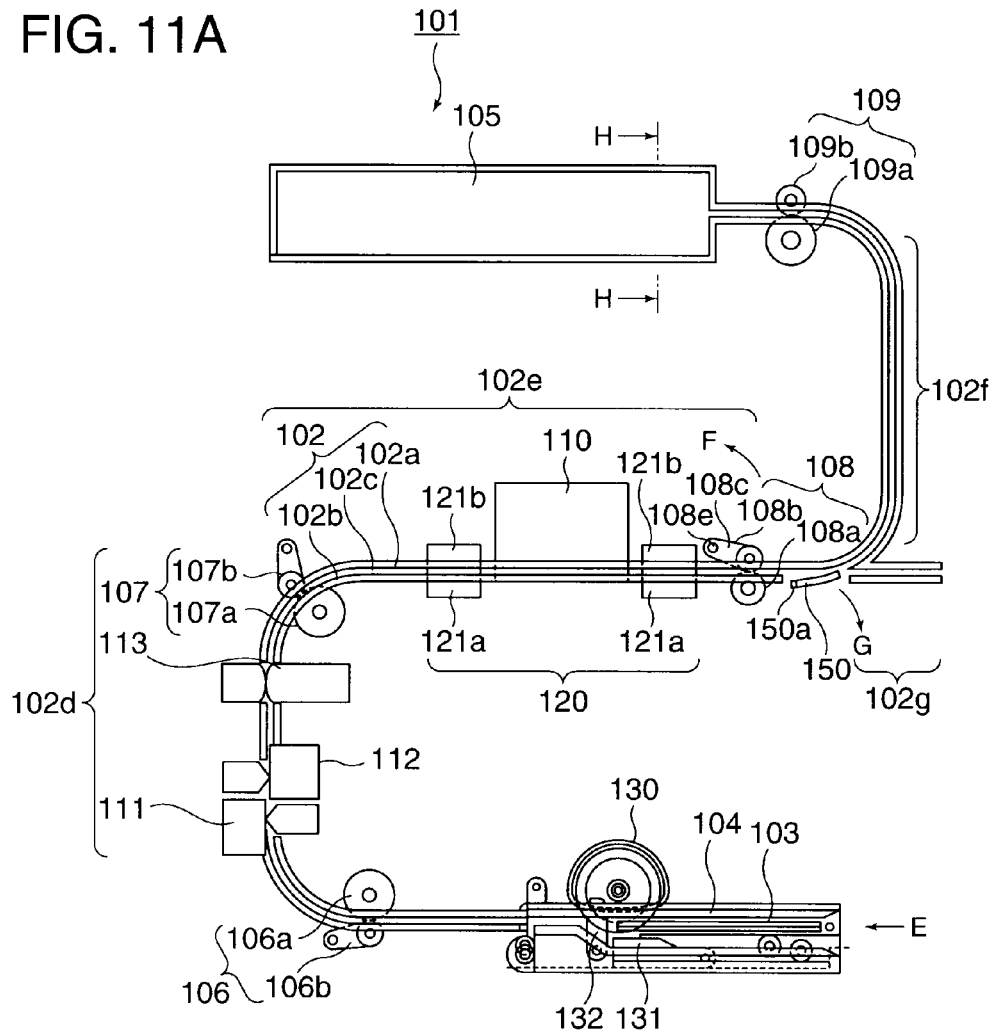
FIG. 11(a) is a schematic plan view of a printer according to another embodiment of the invention.

The discharge rollers 108 include a drive roller 108a and movable roller 108b. The movable roller 108b is disposed to an arm 108c that pivots on center of rotation 108e, and can be set to a paper feed position in contact with the drive roller 108a, and a retracted position separated from the drive roller 108a. FIG. 11(a) shows the movable roller 108b set to the paper feed position. When set to the retracted position, the arm 108c rotates in the direction of arrow F.

Further downstream from the first straight transportation path 102e is a junction to which the second curved transportation path 102f and second straight transportation path 102g are connected. The junction has a switching lever 150. The switching lever 150 pivots on center of rotation 150a, and can be set to guide the check 103 into the second curved transportation path 102f (referred to below as the "curved path position"), or to guide the check 103 into the second straight transportation path 102g (referred to below as the "straight path position"). The switching lever 150 is linked to the arm 108c of the movable roller 108b, and moves in conjunction with the arm 108c.

As shown in FIG. 11(a) when the movable roller 108b contacts the drive roller 108a so that the discharge rollers 108 are in the paper feed position, the switching lever 150 is set to the curved path position. When the arm 108c of the movable roller 108b turns in the direction of arrow B to the retracted position, the switching lever 150 also turns in the direction of arrow G and moves to the straight path position.

The structure of this switching mechanism is described in further detail below.

As shown in FIG. 11(a), the check 103 is normally held by the discharge rollers 108 and conveyed to the second curved transportation path 102f. It is then grabbed by the storage rollers 109 disposed to the second curved transportation path 102f and deposited into the storage unit 105. The storage rollers 109 also include a drive roller 109a and pressure roller 109b, the drive roller 109a driven by a motor not shown and the pressure roller 109b urged by spring force to the drive roller 109a.

Figure 11B:
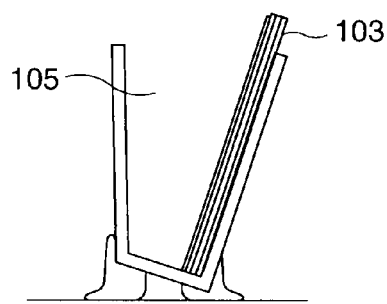
FIG. 11(b) FIG. 11(b) is a section view of the storage unit 105 through line H-H in FIG. 11(a).

As shown in FIG. 11(b), the bottom of the storage unit 105 is sloped, and checks 103 delivered into the storage unit 105 move by force of gravity to the right from the position in line with the transportation path 102 on the left side of the storage unit 105 as seen in the figure. Checks 103 delivered from the transportation path 102 therefore enter the storage unit 105 without interference with other checks 103 already stored in the storage unit 105, and automatically gather in a stack on the right side of the storage unit 105 as seen in the figure.

A validation mechanism 120 is also disposed to the first straight transportation path 102e. This validation mechanism 120 has validation rollers 121a and 121b on the right and left sides of the print head 110 as seen in the figure. These validation rollers 121 transport slip forms in a direction substantially perpendicular to the horizontal conveyance direction of the transportation path 102. The validation mechanism 120 is used to convey forms in the vertical direction for validation printing by the print head 110. To avoid interference with a slip travelling vertically, the movable roller 108b of the discharge rollers 108 must be set to the retracted position. As described above, the switching lever 150 is therefore set to the straight path position. If the length of the slip being transported vertically is such that the leading edge of the form extends outside the first straight transportation path 102e, the form will be guided by the second straight transportation path 102g as an extension of the first straight transportation path 102e, and can therefore travel smoothly vertically without interference with the transportation path guides.

Validation Mechanism

Figure 12:
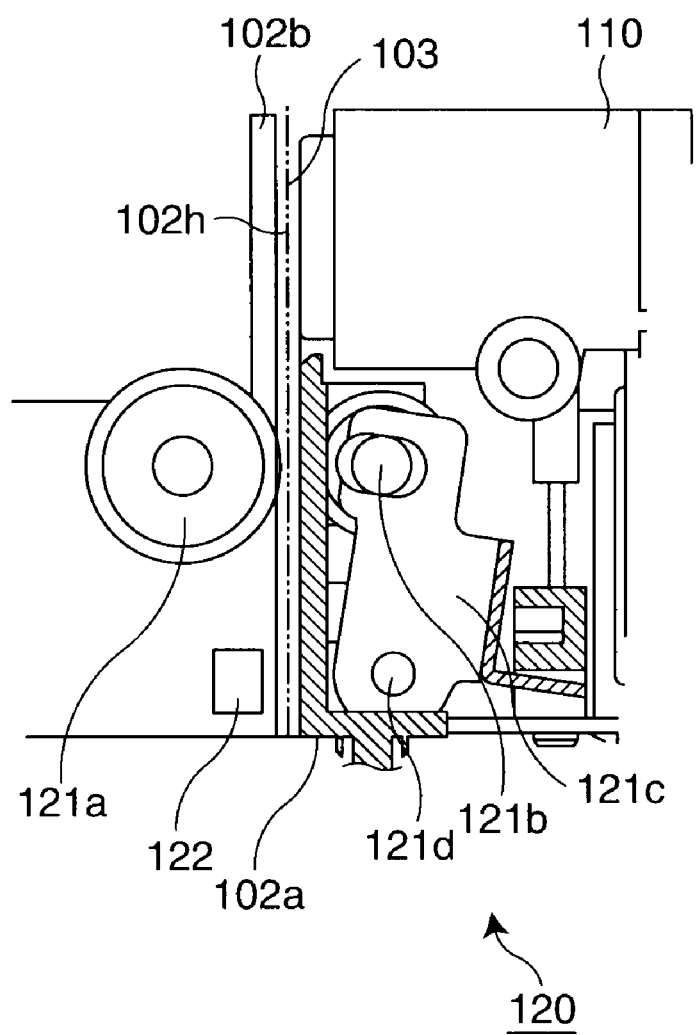
FIG. 12 is a side section view of a validation mechanism.

The validation mechanism is described in detail next with reference to FIG. 12. This validation mechanism uses the space between the outside guide 102a and inside guide 102b as the validation transportation path 102h for validation printing to the check 103 or other slip. This validation transportation path 102h uses part of the first straight transportation path 102e, but the transportation direction is perpendicular to that of the first straight transportation path 102e.

The validation mechanism 120 thus comprises this validation transportation path 102h, fixed validation rollers 121a, and pressure validation rollers 121b. The fixed validation rollers 121a are driven by a vertical paper feed motor not shown. The pressure validation rollers 121b are disposed to an arm 121c that pivots on rotational axis 121d, and can therefore be set to a transportation position where the pressure validation rollers 121b contact the fixed validation rollers 121a for paper feeding, and a retracted position where the pressure validation rollers 121b are separated from the fixed validation rollers 121a.

The process for validation printing to a check 103 is described next. The check 103 is inserted from above to the validation transportation path 102h between the outside guide 102a and inside guide 102b. The pressure validation rollers 121b have a mechanism for moving to the transportation position or retracted position as a result of the arm 121c being driven by an actuator not shown. When a check 103 is inserted, the pressure validation rollers 121b are in the retracted position. The check 103 can therefore be inserted to the bottom of the validation transportation path 102h without interference with the fixed validation rollers 121a or pressure validation rollers 121b.

As described in the preceding embodiment, a validation detector 122 is disposed to the bottom of the validation transportation path 102h. When this validation detector 122 detects that a check 103 has been inserted to the bottom of the validation transportation path 102h, the pressure validation rollers 121b move from the retracted position to the transportation position. The fixed validation rollers 121a and pressure validation rollers 121b then start turning and transport the check 103 upward.

The check 103 is printed when it passes a juxtaposed position opposite the print head 110.

The print head 110 is controlled according to the paper feeding distance from a reference position (i.e., the bottom of the validation transportation path 102h) to print to a specified position on the check 103. The check 103 is then transported further upward and ejected from the validation transportation path 102h. This completes the validation printing process.

Paper Feed Mechanism

The paper feed mechanism for supplying checks 103 stocked in the loading unit 104 to the transportation path 102 is described in detail next with reference to FIG. 13.

Figure 13A:
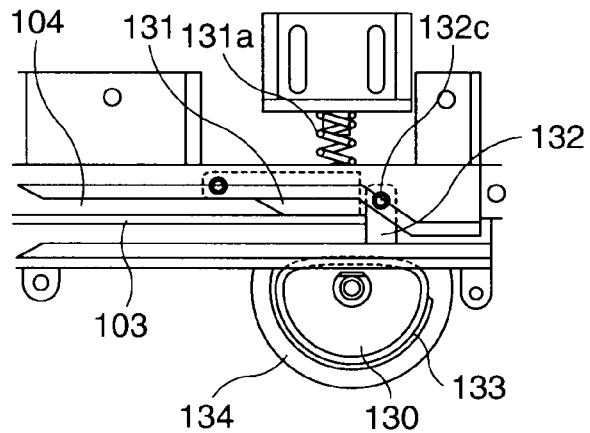
FIG. 13(a) shows the relative positions of the components in the retracted position, that is, when a check 103 is not transported.

As shown in FIG. 13(a), the main parts of this paper feed mechanism are paper feed roller 130 for feeding stocked checks 103 from the loading unit 104, a hopper 131 for pressing the check 103 to the paper feed roller 130 during the paper feed operation, and a pad 132 that contacts the leading edge of the checks 103 so that only the single top check touching the paper feed roller 130 is fed. The paper feed roller 130 is a roller of which one side is flattened, and is mounted coaxially with a cam 133 and roller gear 134. The roller gear 134 engages a motor gear of an ASF drive motor. When the ASF drive motor turns the roller gear 134, the coaxial paper feed roller 130 and cam 133 also turn.

The hopper 131 is urged to the paper feed roller 130 side by a hopper pressure spring 131a, and thus functions to push checks 103 to the paper feed roller 130 when transporting checks 103. The cam 133, hopper 131, and pad 132 are linked so that moving the paper feed roller 130 causes the hopper 131 and pad 132 to operate accordingly as further described below.

Operation of the components of this paper feed mechanism when transporting a slip is described next below with reference to FIG. 13(a-c).

If there is no interference, the hopper 131 works to press the checks 103 to the paper feed roller 130 by means of the force from a hopper pressure spring 131a. When in the retracted position as shown in FIG. 13(a), however, the cam 133 holds the hopper 131 so that it does not apply pressure to the checks 103.

A clockwise torque is applied to the pad 132 by the force from a torsion spring (not shown in the figure), and the cam 133 holds the pad 132 to a position perpendicularly contacting the checks 103. The leading edge part of the checks 103 therefore meet the pad 132 and cannot advance beyond that point.

Figure 13B:
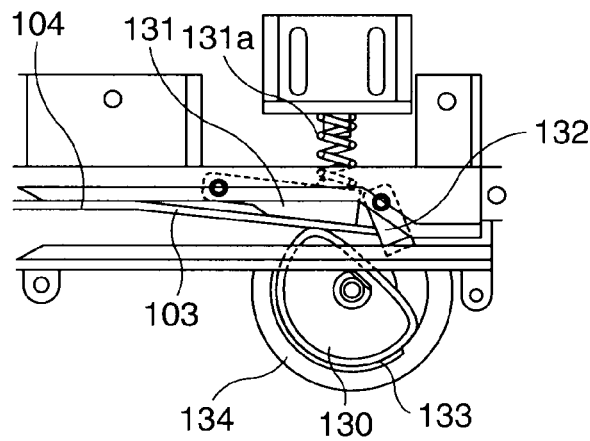
FIG. 13(b) shows the start of paper feeding with the curved part of the paper feed roller 130 contacting the check 103.

To feed the checks 103, the paper feed roller 130 is rotated clockwise by the ASF drive motor not shown to the position shown in FIG. 13(b). In the position shown in FIG. 13(b) the curved part of the paper feed roller 130 begins to touch the check 103. The cam 133 works at this time so that the hopper 131 pushes the checks 103 to the paper feed roller 130 side. The cam 133 also causes the pad 132 to pivot counterclockwise to a diagonal position. If the paper feed roller 130 is then rotated further clockwise, the top check 103 of the stack touching the paper feed roller 130 is carried along the slope of the pad 132.

Figure 13C:
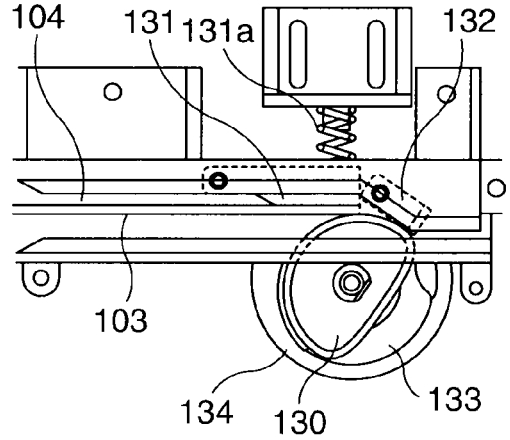
FIG. 13(c) shows the paper feed roller 130 when it rotated further and feeds just the single top check 103.

When the paper feed roller 130 then turns further clockwise to feed the top one check 103 as shown in FIG. 13(c), the cam 133 does not interfere with the hopper 131, and the force of hopper pressure spring 131a therefore causes the hopper 131 to push the checks 103 to the paper feed roller 130.

The cam 133 also rotates the pad 132 to its maximum angle of inclination.

The one top check 103 in the stack contacting the paper feed roller 130 is thus fed along the surface of the pad 132, which is now inclined. The other checks 103 are left in the loading unit 104 because the friction between the leading edge part and the pad 132 is greater than the friction and electrostatic attraction between the checks 103.

The feed mechanism described above thus feeds the checks 103 one at a time into the transportation path 102.

Switching Mechanism

The switching mechanism for changing the position of the switching lever 150 to the second curved transportation path side (the curved path position) or to the second straight transportation path side (the straight path position) is shown in FIG. 14(a-c).

Figure 14A:
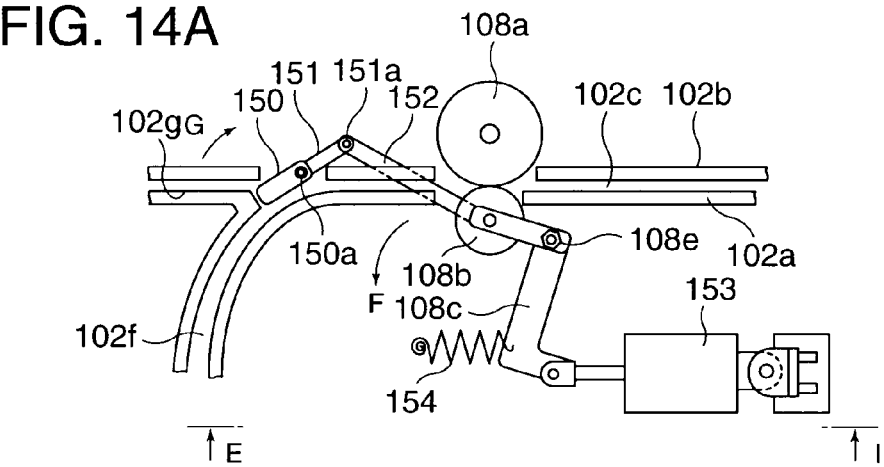
Figure 14B:
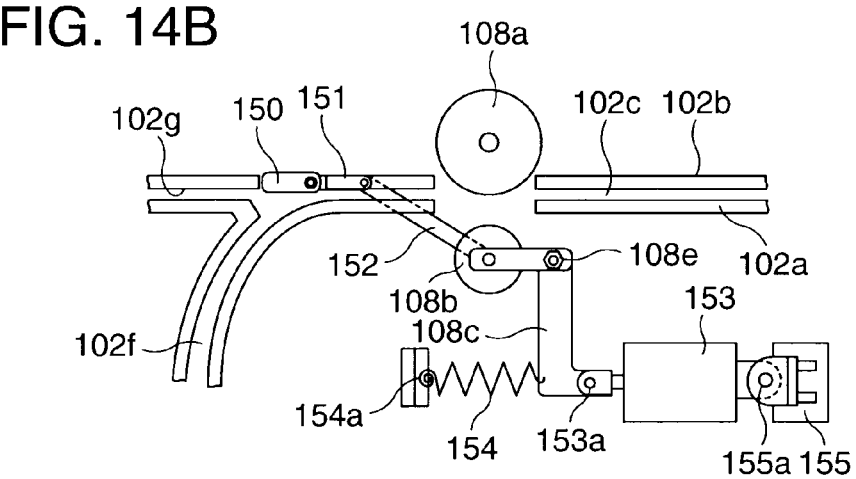
Figure 14C:
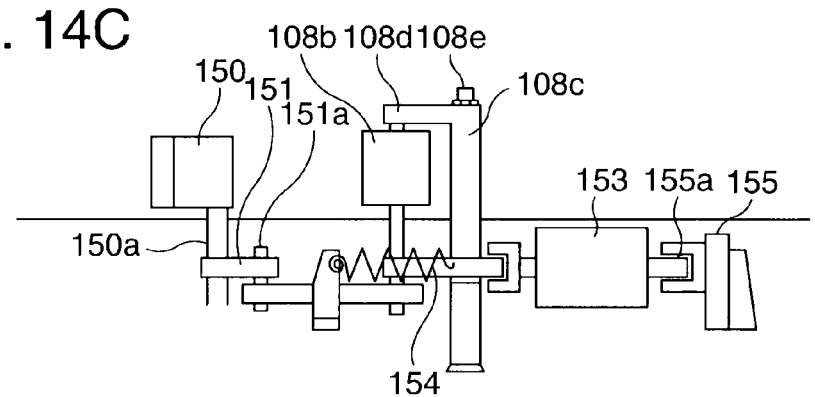
FIG. 14(c) is a side section view as seen from arrow I in FIG. 14(a)

The positioning of the components is described first with reference to FIG. 14(a) and FIG. 14(c). The drive roller 108a is rotated clockwise by a horizontal paper feed motor not shown. As shown in FIG. 14(c), the movable roller 108b is rotatably mounted to the arm 108c by means of an intervening rotary shaft 108d.

The arm 108c has a double L-shaped configuration when seen from above with two end legs each bent 90 degrees to the main leg, and is rotatably affixed to the document processing system by means of an intervening rotary shaft 108e. One end of this arm 108c is connected to arm 152 by an extension of the rotary shaft 108d. The other end of this arm 152 is connected by a pin 151a to arm 151, which is united with the switching lever 150. The switching lever 150 and arm 152 are united by mounting to a common rotary shaft 150a, and rotate around this rotary shaft 150a.

The other end of the arm 108c is connected to a solenoid 153 by an intervening pin 153a. The other end of the solenoid 153 is connected to a bracket 155 by an intervening pin 155a, and the bracket 155 is affixed to the printing apparatus 101. These link components are disposed below the transportation path 102 traversed by the check 103, and therefore do not interfere with check transportation.

A tension spring 154 is connected to the arm 108c on the side opposite the connection between the arm 108c and solenoid 153. The other end of this tension spring 154 is connected to bracket 154a, which is affixed to the printing apparatus 101.

When the solenoid 153 is not excited, the arm 108c is pulled by the tension spring 154, and the movable roller 108b is set to the paper feed position contacting the drive roller 108a as shown in FIG. 14(a). The switching lever 150 is linked to the arm 108c by arm 152 and arm 151, and is thus set to the curved path position. If the drive roller 108a is then driven to feed a check 103, the check 103 is guided by the switching lever 150 and transported to the second curved transportation path 102f.

When the solenoid 153 is excited, the solenoid arm retracts, turning the arm 108c in the direction of arrow F. The switching lever 150 linked to the arm 108c therefore turns in the direction of arrow G to the position shown in FIG. 14(b). As shown in FIG. 14(b), the force of the solenoid 153 moves the movable roller 108b to the retracted position separated from the drive roller 108a, and the switching lever 150 linked to the arm 108c moves to the straight path position conveying the check 103 into the second straight transportation path 102g, which is parallel to the first straight transportation path. As a result, a check loaded from above for validation printing can be transported vertically without interference from the discharge rollers 108 and second curved transportation path 102f.

Other Versions

Figure 15A:
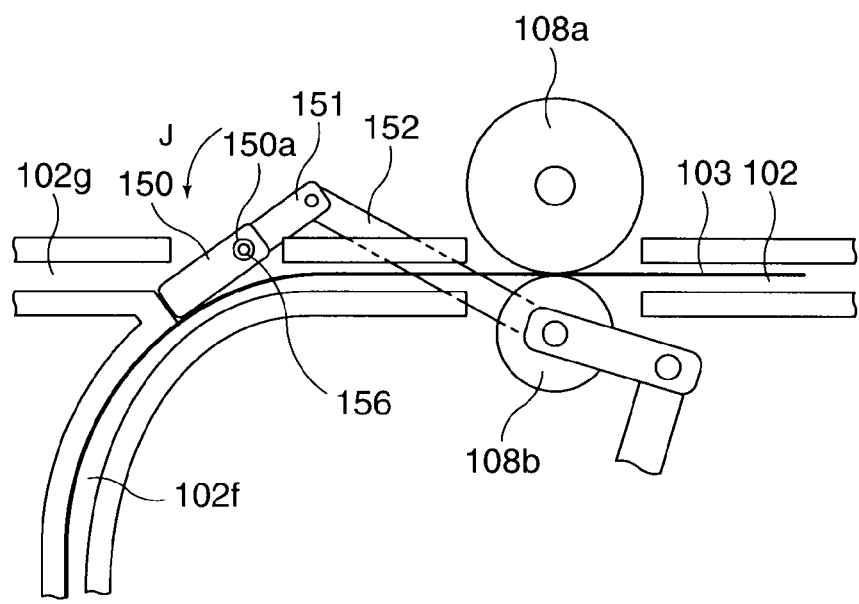
FIG. 15(a-b) are plan views showing the movement of the switching lever of the switching mechanism with the switching lever shown in two different positions respectively.

The arm 151 and switching lever 150 are united in the switching mechanism described above. As shown in FIG. 15(a,b), however, the switching lever 150 could be mounted to the arm 151 by an intervening rotary shaft 150a, and urged in the direction of arrow J by a torsion spring 156. The strength of this torsion spring 156 is weaker than the rigidity of the check 103.

If the switching lever 150 is set to the second curved transportation path 102f (the curved path position) before the leading edge of the check 103 reaches the switching lever 150, the check 103 is advanced by rotation of the drive roller 108a, guided by the switching lever 150, and conveyed to the second curved transportation path 102f.

Figure 15B:
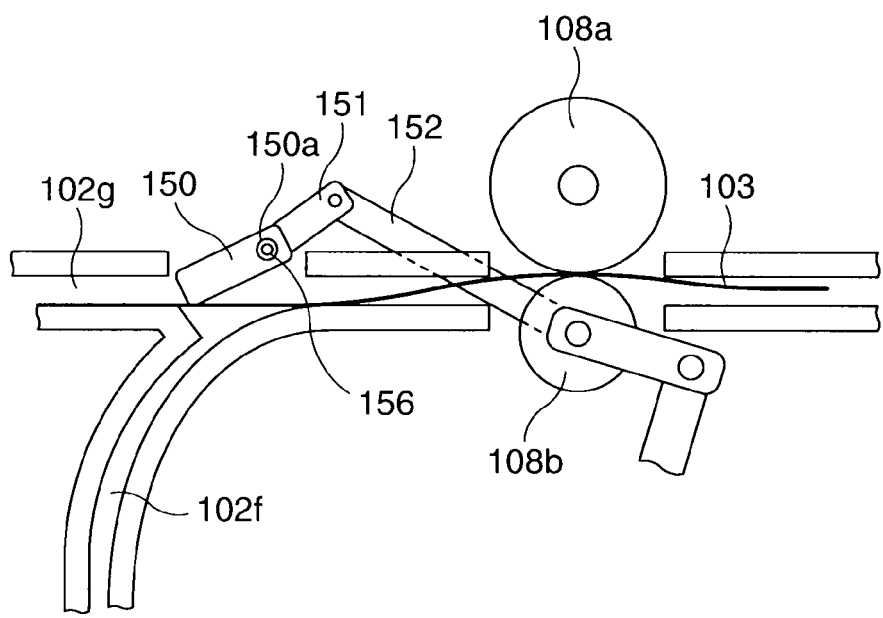

However, if the switching lever 150 is set to the second straight transportation path 102g side (straight path position) when the leading edge of the check 103 reaches the switching lever 150, and the switching lever 150 is switched to the second curved transportation path 102f side (curved path position) after the leading edge of the check 103 enters the second straight transportation path 102g, as shown in FIG. 15(b), the check 103 continues to advance into the second straight transportation path 102g as the drive roller 108a turns because the rigidity of the check 103 is greater than the strength of the torsion spring 156. Note, however, that this requires providing second transportation rollers (not shown in the figure) to transport the check 103 until the leading edge of the check 103 enters the second straight transportation path 102g.

If data was read from the check 103 normally, the check 103 travels through the transportation path 102 and is deposited in the storage unit 105. If a data read error occurs, however, the check 103 can be conveyed through the second straight transportation path 102g and ejected. Thus selectively switching the transportation path can be achieved by control that changes the timing of switching lever 150 operation.

The switching mechanism could also be configured so that the switching lever 150 operates independently of the discharge rollers 108. In this case the position of the switching lever 150 can be changed irrespective of whether the discharge rollers 108 are set to the second curved transportation path side or the second straight transportation path side. This switching lever 150 is driven by a solenoid or other actuator different from the discharge rollers 108. This configuration enables changing the transportation path of the check 103 without considering the timing for changing the position of the movable roller 108*b*.

Form transportation in the vertical direction shall also not be limited to validation printing, and a check 103 travelling horizontally through the first straight transportation path 102*e* could also be discharged vertically.

ADVANTAGES OF THE INVENTION

The printer according to the present invention has two mutually perpendicular transportation paths housed in a single compact device to perform printing as well as other document or check processing tasks which conventionally requires separate devices. When checks are conventional processed at a bank teller window, for example, one device is typically used for reading check data and printing an endorsement, a separate printer is used for printing a receipt based on the results of check processing, and a separate validation printer is used for reprinting the back of the check. This causes the problems described below, all of which are solved by the present invention.

(1) Installing multiple devices in a confined work space is difficult.

(2) Data errors result from data entry errors as a resulting of using multiple devices to process each check.

(3) Handling errors result from loading each form to multiple devices.

(4) Productivity drops from excessive handling time and idle time.

Although the present invention has been described in connection with the preferred embodiments thereof and with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printer comprising:
a paper feed unit constructed to house sheet paper;
a first conveyance path;
a first conveyance mechanism configured to convey sheet paper from the paper feed unit using the first conveyance path;
a roll paper compartment constructed to hold roll paper;
a second conveyance path;
a second conveyance mechanism configured to convey roll paper from the roll paper compartment using the second conveyance path;
a third conveyance path configured to convey second sheet paper, the third conveyance path including at least a part of the second conveyance path;
a third conveyance mechanism configured to convey second sheet paper using the third conveyance path;
a printer head configured to print on sheet paper and roll paper; and
a carriage configured to move the printer head in the direction in which sheet paper is conveyed and along a direction substantially orthogonal to the direction in which roll paper is conveyed.

* * * * *